(12) United States Patent
Sakamoto et al.

(10) Patent No.: US 7,724,471 B2
(45) Date of Patent: May 25, 2010

(54) THIN-FILM MAGNETIC HEAD WITH HEATING MEANS FOR ADJUSTING MAGNETIC SPACING

(75) Inventors: Takamitsu Sakamoto, Tokyo (JP); Taro Oike, Tokyo (JP); Katsuki Kurihara, Tokyo (JP); Eric Cheuk Wing Leung, Hong Kong (CN)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 503 days.

(21) Appl. No.: 11/282,651

(22) Filed: Nov. 21, 2005

(65) Prior Publication Data

US 2006/0126224 A1 Jun. 15, 2006

(30) Foreign Application Priority Data

Dec. 13, 2004 (JP) .............................. 2004-359775
May 30, 2005 (JP) .............................. 2005-157353

(51) Int. Cl.
*G11B 21/21* (2006.01)
(52) U.S. Cl. ..................................... 360/128
(58) Field of Classification Search ................... 360/128
See application file for complete search history.

(56) References Cited

U.S. PATENT DOCUMENTS

| 5,991,113 | A | 11/1999 | Meyer et al. | |
|---|---|---|---|---|
| 6,920,020 | B2 * | 7/2005 | Yamanaka et al. | 360/317 |
| 7,068,468 | B2 * | 6/2006 | Kamijima | 360/128 |
| 7,180,707 | B2 * | 2/2007 | Koide et al. | 360/128 |
| 7,203,035 | B2 * | 4/2007 | Koide et al. | 360/294.7 |
| 7,362,544 | B2 * | 4/2008 | Shiramatsu et al. | 360/234.5 |
| 2003/0099054 | A1 | 5/2003 | Kamijima et al. | |
| 2003/0174430 | A1 | 9/2003 | Takahashi et al. | |
| 2004/0130820 | A1 * | 7/2004 | Ota | 360/128 |
| 2004/0165311 | A1 * | 8/2004 | Yamanaka et al. | 360/128 |
| 2004/0184192 | A1 * | 9/2004 | Ota et al. | 360/128 |
| 2006/0023367 | A1 * | 2/2006 | Suk | 360/323 |

FOREIGN PATENT DOCUMENTS

| JP | 2000-260009 | 9/2000 |
|---|---|---|
| JP | 2003-168274 | 6/2003 |
| JP | 2003-272335 | 9/2003 |
| JP | 2004-303320 | 10/2004 |
| JP | 2006-31817 | 2/2006 |

* cited by examiner

*Primary Examiner*—Mark Blouin
(74) *Attorney, Agent, or Firm*—Oblon, Spivak, McClelland, Maier & Neustadt, L.L.P.

(57) ABSTRACT

A thin-film magnetic head that the protrusion of the head end surface due to heat generated from the heating means becomes large enough to set the magnetic spacing $d_{MS}$ to the smaller value efficiently is provided. The head comprises: a substrate having an element-formed surface on which at least one concave portion is formed and an ABS; at least one magnetic head element formed above or on the element-formed surface; at least one thermal expansion layer embedded in the at least one concave portion; and at least one heating means positioned directly above the at least one thermal expansion layer.

37 Claims, 17 Drawing Sheets

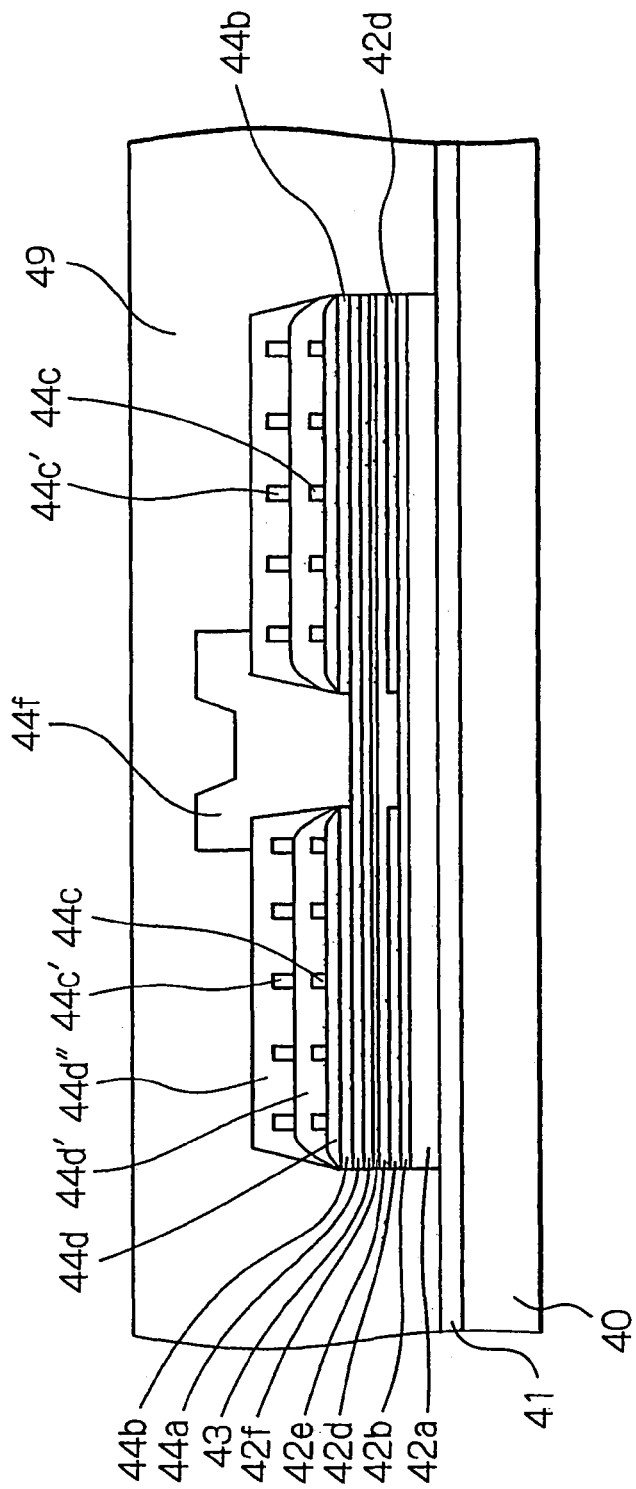

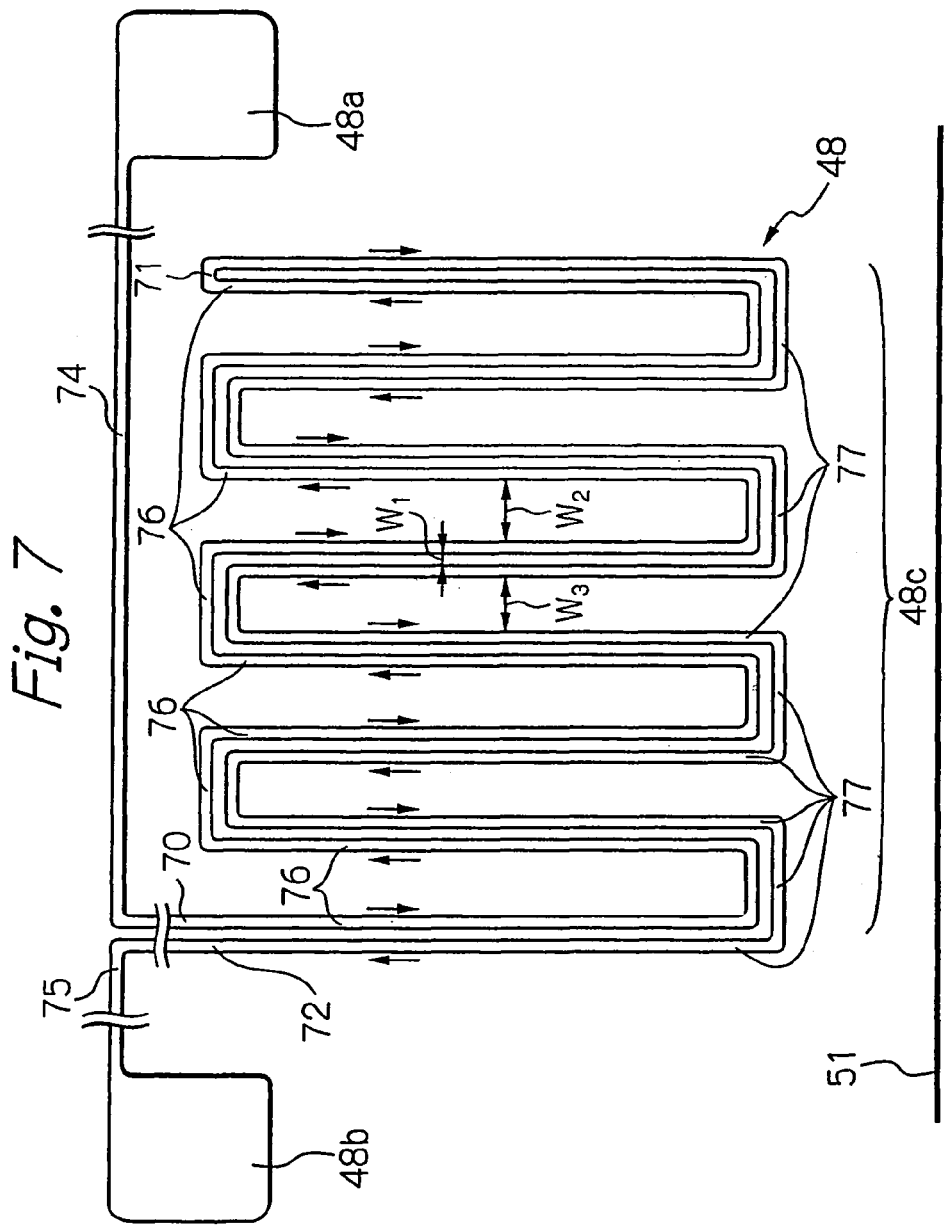

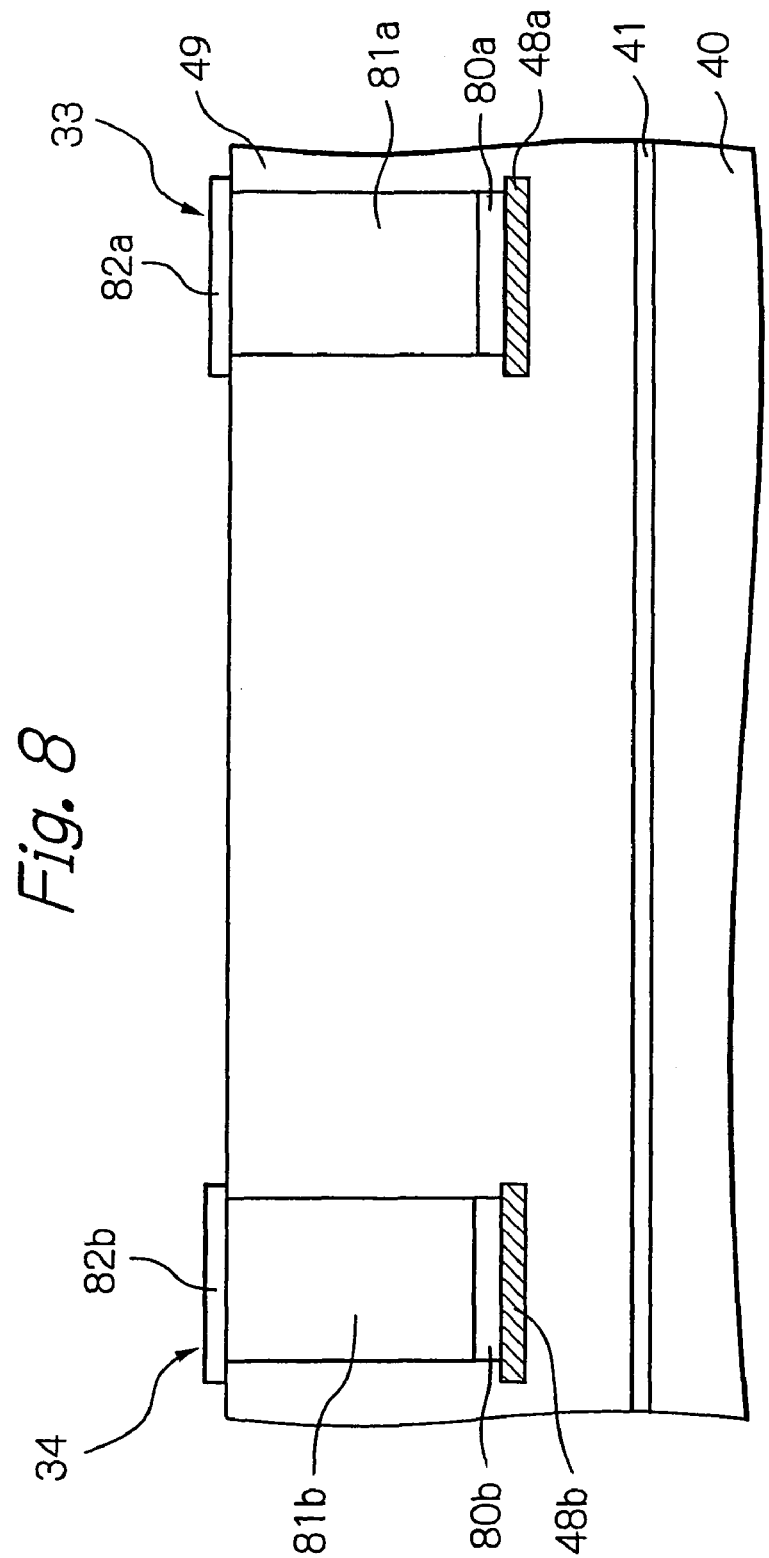

THIN-FILM MAGNETIC HEAD WITH HEATING MEANS FOR ADJUSTING MAGNETIC SPACING

PRIORITY CLAIM

This application claims priorities from Japanese patent application No. 2004-359775, filed on Dec. 13, 2004 and Japanese patent application No. 2005-157353, filed on May 30, 2005, which are incorporated herein by reference.

BACKGROUND OF THE INVENTION

1. Field of the Invention

The present invention relates to a thin-film magnetic head with a heating means, a head gimbal assembly (HGA) with the thin-film magnetic head and a magnetic disk drive apparatus with the HGA.

2. Description of the Related Art

In a magnetic disk drive apparatus, when writing or reading signals, a thin-film magnetic head (slider) hydrodynamically flies with a predetermined spacing (flying height) on a rotating magnetic disk. While flying on the magnetic disk, the thin-film magnetic head writes signals to the magnetic disk using magnetic fields generated from an inductive write head element, and reads signals by sensing magnetic fields corresponding to the signals from the magnetic disk with the use of an magnetoresistive (MR) effect read head element. On these cases, a magnetic spacing $d_{MS}$ is defined as an effective magnetic distance between ends of these head elements and the surface of the magnetic disk.

With higher recording density due to increasing data storage capacity and miniaturization of the magnetic disk drive apparatus in recent years, a track width of the thin-film magnetic head is becoming smaller. In order to avoid the degradation of writing and reading performance due to the smaller track width, latest magnetic disk drive apparatuses actually have the magnetic spacing $d_{MS}$ reduced down to the order of 10 nm. In the case, some techniques are proposed, which control the smaller $d_{MS}$ with some accuracy by positively utilizing a thermal pole tip protrusion (TPTP) phenomenon with the use of a heater provided near or inside the magnetic head element, for example, in U.S. Pat. No. 5,991,113, US Patent Publications Nos. 2003/0174430 A1 and 2003/0099054 A1, and Japanese Patent Publication No. 05-020635A.

However, in the thin-film magnetic head with the above-mentioned heater, the amount of protrusion of a trailing portion of an overcoat layer covering the head elements toward the magnetic disk surface due to heat generated from the heater, becomes larger than that of the head end surface adjacent to the end of the head elements. In addition, an air bearing surface (ABS) of the slider is usually inclined so that the trailing portion is closer to the magnetic disk surface. Therefore, the difference between the amounts of these protrusions is likely to cause the protruded trailing portion to contact the magnetic disk surface. As the result, a thermal asperity that is a problem such that the MR read head element outputs abnormal signals due to heat generated by the contact has possibilities to occur. Further, the contact has a risk of causing physical damage or crash of the magnetic head element and the magnetic disk. Moreover, because of the existence of the protruded trailing portion, the head end surface adjacent to the end of the magnetic head element needs to be separated from the magnetic disk surface by a required amount, and therefore, the magnetic spacing $d_{MS}$ can not be efficiently set to an adequately small value.

Furthermore, the thin-film magnetic head with the above-mentioned conventional heater can not adapt to lower electric power consumption of the device mounting the magnetic disk drive apparatus.

Currently, some mobile devices such as a mobile phone are encouraged to mount the magnetic disk drive apparatus because the devices need to deal with large volumes of video data, music data and so on. However, the electric power consumption of the devices must be reduced inevitably, and then, the power supply of the preamplifier for driving the mounted magnetic disk drive apparatus is limited more than ever. Therefore, in the thin-film magnetic head with the above-mentioned conventional heater, the power required for reducing the magnetic spacing $d_{MS}$ to the predetermined value can not be surely supplied to the heater. As the result, the head end surface adjacent to the end of the magnetic head element is not protruded to the required extent, and therefore, sufficient writing and reading performances can not be obtained.

BRIEF SUMMARY OF THE INVENTION

Therefore, it is an object of the present invention to provide a thin-film magnetic head that the protrusion of the head end surface due to heat generated from the heating means becomes large enough to set the magnetic spacing $d_{MS}$ to the smaller value efficiently at the head end surface adjacent to the ends of the head elements, an HGA provided with this thin-film magnetic head and a magnetic disk drive apparatus provided with this HGA. And it is another object of the present invention to provide a thin-film magnetic head with a heating means by which the required protrusion of the head end surface is obtained with smaller electric power consumption than the conventional art, an HGA provided with this thin-film magnetic head and a magnetic disk drive apparatus provided with this HGA.

Here, some terms will be defined before explaining the present invention. In a layered structure of the magnetic head element formed on an element-formed surface of the slider substrate, a component that is closer to the surface of the slider substrate than a standard layer is defined to be "below" or "lower" in relation to the standard layer, and a component that is in the stacking direction side of the standard layer is defined to be "above" or "upper" in relation to the standard layer.

According to the present invention, a thin-film magnetic head is provided, which comprises: a substrate having an element-formed surface on which at least one concave portion is formed and an ABS; at least one magnetic head element formed above or on the element-formed surface; at least one thermal expansion layer embedded in the at least one concave portion; and at least one heating means positioned directly above the at least one thermal expansion layer.

Here, the at least one heating means is preferably provided in a position opposite to the ABS in relation to the at least one magnetic head element. Also preferably, the at least one heating means is at least one heating conductive layer formed of a conductive material generating heat by current flow. And also preferably, the at least one thermal expansion layer is formed of an insulating material.

It is also preferable that a spacer layer formed of an insulating material is provided between the at least one heating means and the at least one thermal expansion layer.

Furthermore, an upper surface of the at least one thermal expansion layer is preferably a planarized plane with the same height as the surrounding element-formed surface. On the contrary, it is also preferable that at least center portion of an upper surface of the at least one thermal expansion layer is positioned below the element-formed surface, and a lower surface of the at least one heating means is positioned below the element-formed surface.

The amount of a depth of the at least one concave portion from the element-formed surface is preferably 6 to 100 µm, and is more preferably 40 to 100 µm.

Preferably, the at least one magnetic head element comprises at least one inductive write head element and/or at least one giant/tunnel MR read head element. And an overcoat layer is preferably formed so as to cover over the at least one magnetic head element and the least one heating means.

According to the present invention, a HGA is further provided, which comprises the above-mentioned thin-film magnetic head and trace conductors for supplying currents to the at least one heating means.

According to the present invention, a magnetic disk drive apparatus is further provided, which comprises the above-mentioned at least one HGA and a heating control means for controlling currents supplied to the at least one heating means.

Here, the heating control means is preferably a control means for supplying currents to the at least one heating means at least during operation of the at least one magnetic head element. Further, it is also preferable that the heating control means comprises a signal system for controlling the at least one heating means, and the signal system controls currents supplied to the at least one heating means independently from operations of a signal system for controlling operations of the at least one magnetic head element.

The heating control means also preferably comprises a detecting means for detecting an acoustic emission component included in a reproduced data signal from the at least one magnetic head element and controls currents supplied to the at least one heating means according to the amount of the acoustic emission component detected by the detecting means.

The heating control means also preferably comprises a temperature detecting means for detecting a temperature inside the magnetic disk drive apparatus and controls currents supplied to the at least one heating means according to a degree of the temperature detected by the temperature detecting means.

Further objects and advantages of the present invention will be apparent from the following description of preferred embodiments of the invention as illustrated in the accompanying drawings. Some elements have been designated with same reference numerals in the different drawings.

BRIEF DESCRIPTION OF THE SEVERAL VIEWS OF THE DRAWINGS

FIG. 6 shows a cross-sectional view taken along line B-B shown in FIG. 4 illustrating a structure of the thin-film magnetic head according to the embodiment shown in FIG. 4;

FIG. 7 shows a plain view illustrating a structure of the heating conductive layer of the thin-film magnetic head according to the embodiment in FIG. 4;

FIG. 8 shows a cross-sectional view taken along line C-C in FIG. 4 illustrating a structure of the drive electrodes for the heating conductive layer;

DETAILED DESCRIPTION OF THE INVENTION

Figure 1:
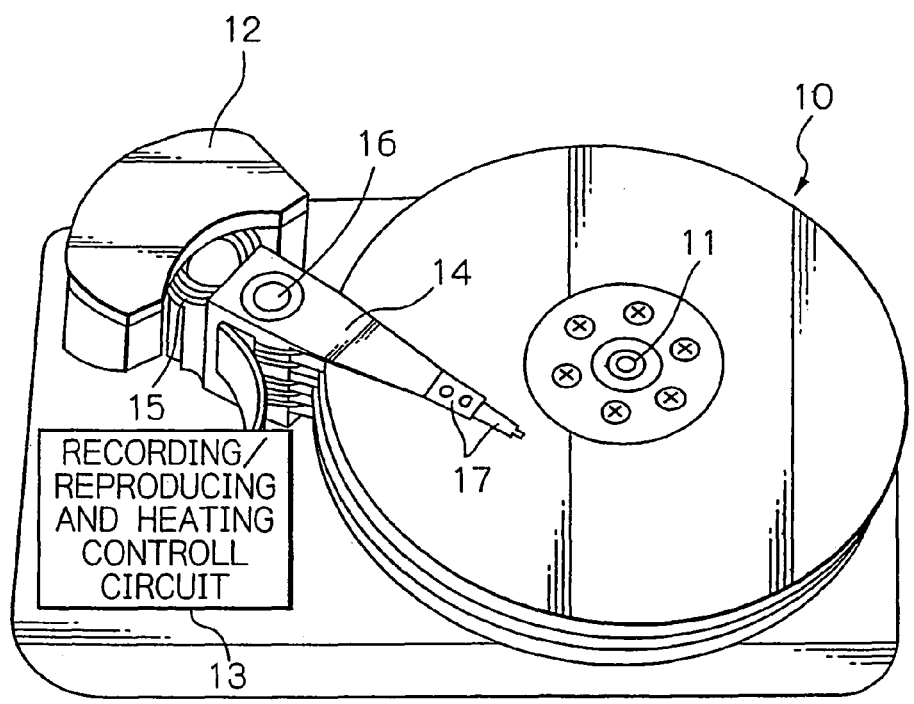
FIG. 1 shows a perspective view schematically illustrating a structure of a main part of an embodiment of a magnetic disk drive apparatus according to the present invention.
Figure 2:
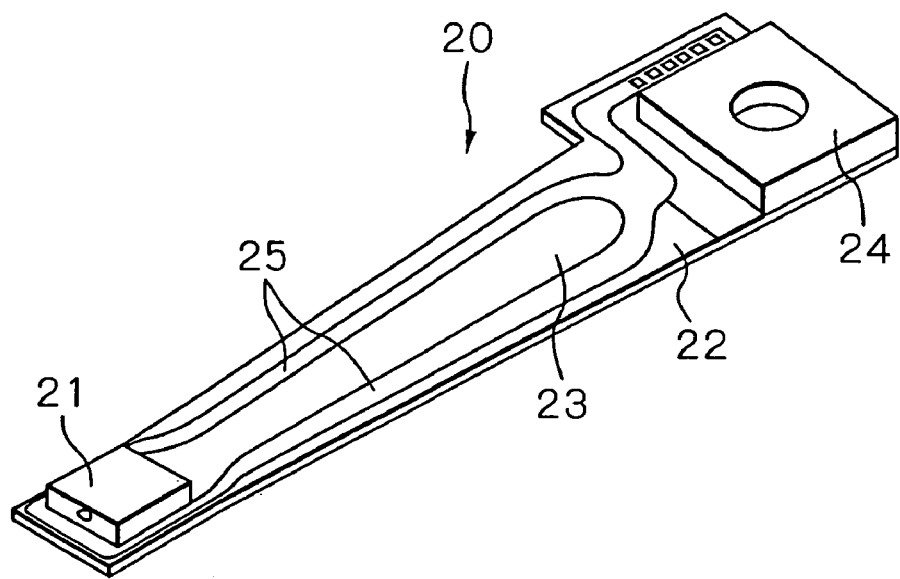
FIG. 2 shows a perspective view illustrating an embodiment of an HGA according to the present invention.
Figure 3:
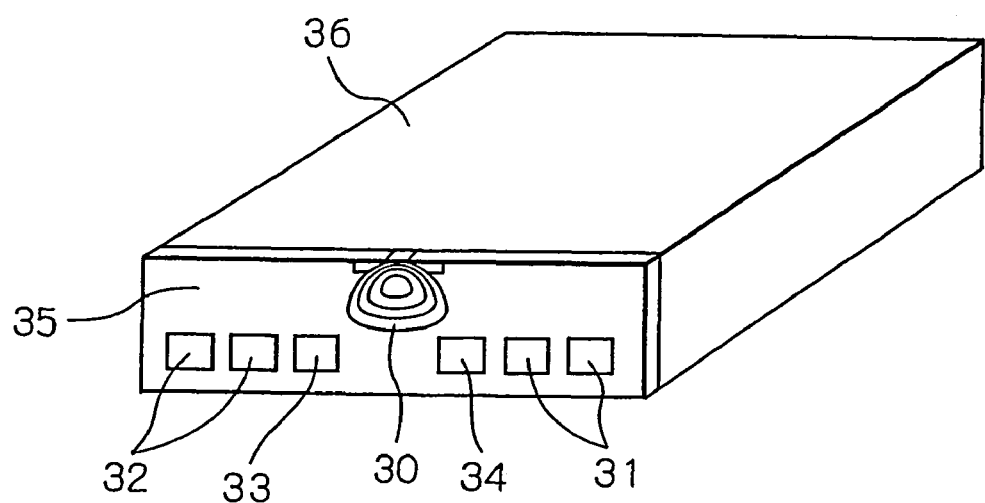
FIG. 3 shows a perspective view of an embodiment of a thin-film magnetic head (slider) provided on the end portion of the HGA.

FIG. 1 shows a perspective view schematically illustrating a structure of a main part of an embodiment of a magnetic disk drive apparatus according to the present invention, FIG. 2 shows a perspective view illustrating an embodiment of an HGA according to the present invention, and FIG. 3 shows a perspective view of an embodiment of a thin-film magnetic head (slider) provided on the end portion of the HGA.

In FIG. 1, reference numeral 10 indicates a plurality of magnetic disks rotating around a rotational axis of a spindle motor 11, 12 indicates an assembly carriage device for positioning a thin-film magnetic head (slider) on a track, and 13 indicates a recording/reproducing and heating control circuit for controlling read/write operations and heating operations of the thin-film magnetic head, respectively.

The assembly carriage device 12 is provided with a plurality of drive arms 14. These drive arms 14 are rotatable around a pivot bearing axis 16 by means of a voice coil motor (VCM) 15 and stacked in the direction along this axis 16. An HGA 17 is provided on the end portion of each drive arm 14. A slider is mounted on each HGA 17 in such a way as to face the surface of each magnetic disk 10. The each number of the magnetic disks 10, the drive arms 14, the HGAs 17 and the thin-film magnetic heads (sliders) can also be only one.

As shown in FIG. 2, the HGA is constructed by fixing a slider 21 having magnetic head element on an end portion of a suspension 20 and by electrically connecting one end of a wiring member 25 to signal electrodes of the slider 21.

The suspension 20 is mainly constructed of a load beam 22, a flexure 23 with elasticity fixed and supported on this load beam 22, a base plate 24 provided on the base portion of the load beam 22, and the wiring member 25 that is made up of trace conductors and connection pads electrically connected to both ends of the trace conductors and is provided on the flexure 23.

It is obvious that the structure of the suspension in the HGA according to the present invention is not limited to the above-described one. Though not shown in the figure, it is also possible to attach a head drive IC chip at some midpoint of the suspension 20.

As shown in FIG. 3, the thin-film magnetic head (slider) according to the present embodiment is provided with a magnetic head element 30 as an inductive write head element and an MR read head element, total of four signal electrodes 31 and 32 connected to these elements, and total of two drive electrodes 33 and 34 for flowing currents through a heating conductive layer that is not shown in FIG. 3, all of which are formed on an element-formed surface 35. Reference numeral 36 indicates an ABS of the slider. The number and positions of the electrodes are not limited to the mode in FIG. 3. In the embodiment shown in FIG. 3, there are six electrodes, however it is also possible to provide five electrodes and a ground connecting to the slider substrate.

Figure 4:
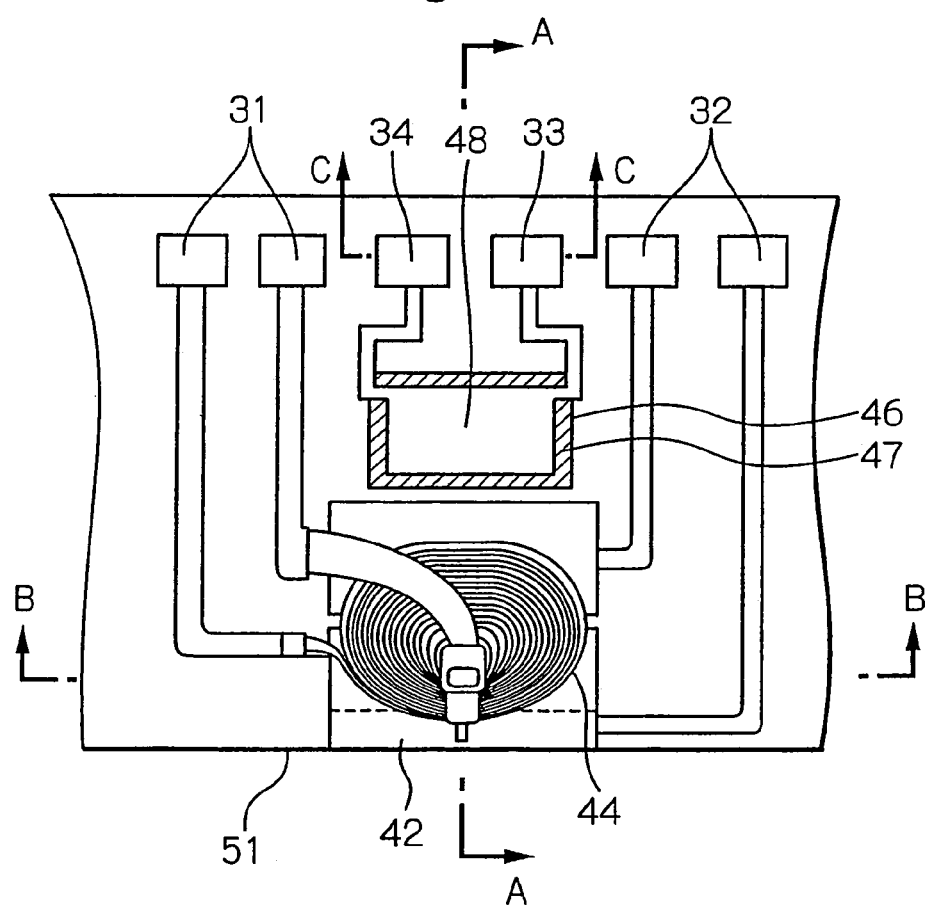
FIG. 4 shows a plain view illustrating an embodiment of the thin-film magnetic head according to the present invention viewed through from the side of the element-formed surface of the slider substrate.
Figure 5A:
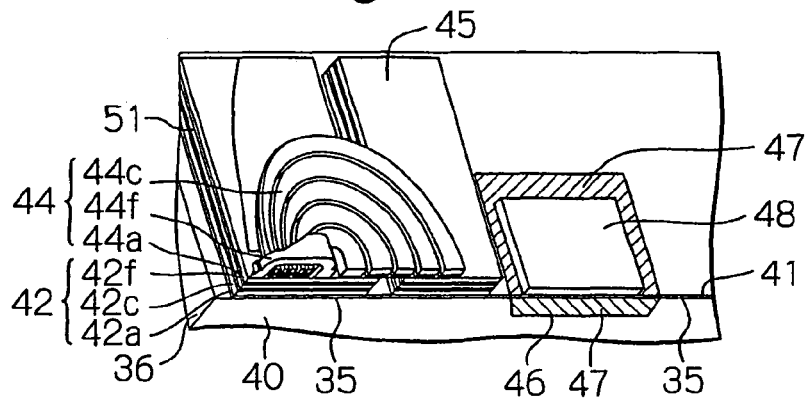
FIG. 5a shows a perspective view including a cross-section surface taken along line A-A shown in FIG. 4.
Figure 5B:
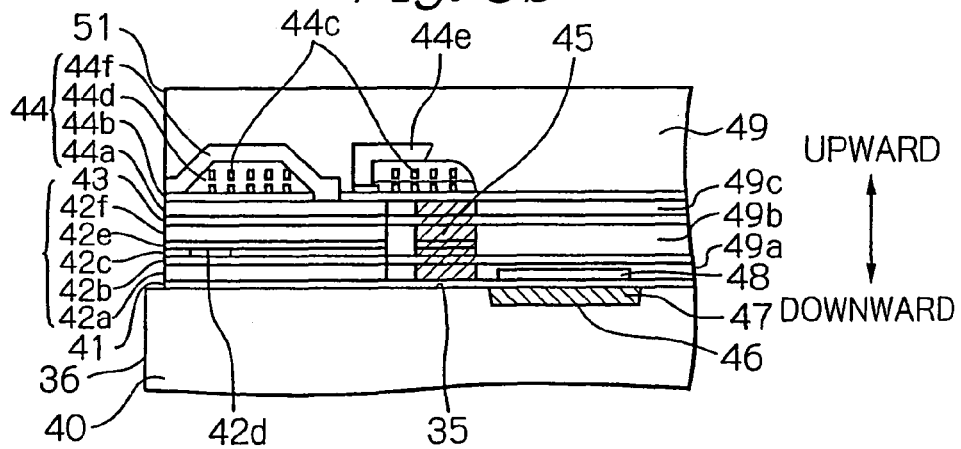
FIG. 5b shows the cross-sectional view taken along the line A-A.
Figure 5C:
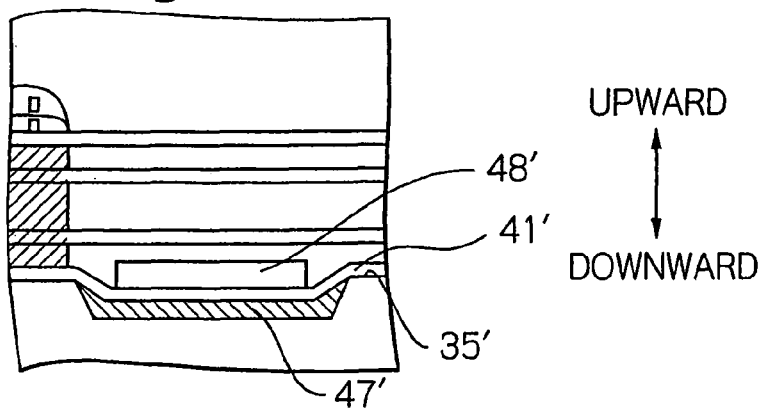
FIG. 5c shows an alternative on the position of the heating conductive layer as the heating means.

FIG. 4 shows a plain view illustrating an embodiment of the thin-film magnetic head according to the present invention viewed through from the side of the element-formed surface of the slider substrate, FIG. 5*a* shows a perspective view including a cross-section surface taken along line A-A shown in FIG. 4, and FIG. 5*b* shows the cross-sectional view taken along the line A-A. The number of turns of the coil in FIGS. 5*a* and 5*b* is shown as if to be smaller than the number of turns in FIG. 4 for simplicity of drawings. The coil may also be a two-layered coil or a helical coil. Further, FIG. 5*c* shows an alternative on the position of the heating conductive layer as the heating means.

In FIG. 4, the two signal electrodes 31 are connected with the inductive write head element 44, and the two signal electrodes 32 are connected with the MR read head element 42. The drive electrodes 33 and 34 are connected with the heating conductive layer 48.

In FIG. 5*a*, the slider substrate 40 has the ABS 36 and flies hydrodynamically over the surface of the rotating magnetic disk with a predetermined space during write and read operations. The MR read head element 42, the inductive write head element 44, a concave portion 46, a thermal expansion layer 47 embedded in the concave portion 46, and the heating conductive layer 48 as the heating means are formed on one side surface (element-formed surface) 35 of the slider substrate 40 when the ABS 36 is set to a bottom.

The MR read head element 42 includes an MR layer 42*c*, a lower shield layer 42*a* and an upper shield layer 42*f* disposed in positions sandwiching the MR layer 42*c*. The MR layer 42*c* includes a current-in-plane giant magnetoresistive (CIP-GMR) multilayer, a current-perpendicular-to-plane giant magnetoresistive (CPP-GMR) multilayer or a tunnel magnetoresistive (TMR) multilayer and senses magnetic fields corresponding to signals with very high sensitivity. When the MR layer 42*c* includes the CPP-GMR multilayer or the TMR multilayer, the lower shield layer 42*a* and the upper shield layer 42*f* act also as a lower electrode and an upper electrode, respectively. The lower shield layer 42*a* and upper shield layer 42*f* are magnetic layers and play the role of shielding external magnetic fields that causes noise to the MR layer 42*c*.

The inductive write head element 44 includes a lower magnetic pole layer 44*a*, an upper magnetic pole layer 44*f* and a coil layer 44*c*. The upper and lower magnetic pole layers 44*f* and 44*a* are magnetic paths to converge and guide magnetic flux induced by the current flowing through the coil layer 44*c* up to the magnetic disk surface onto which data is to be written. Instead of the upper shield layer 42*f* and the lower magnetic pole layer 44*a*, only one magnetic layer may be formed which serves as these layers.

The ends of the MR read head element 42 and the inductive write head element 44 facing the magnetic disk surface extend to the head end surface 51. The head end surface 51 is coated with diamond like carbon (DLC) and so on as a protective film. Here, the magnetically effective distance between the magnetic disk surface and the head end surface 51 adjacent to the ends of the read and write head elements during write/read operations corresponds to the magnetic spacing $d_{MS}$.

The concave portion 46 is a dug portion on the element-formed surface 35 of the slider substrate 40, in which the cross-section has a rectangle shape or a trapezoid shape. The thermal expansion layer 47 is formed of a material with relatively larger coefficient of thermal expansion, and embedded in the concave portion 46. The heating conductive layer 48 is formed of a conductive material that generates heat by applying the current thereto, and is provided in a position directly above the thermal expansion layer 47 through the insulating layer 41 and opposite to the head end surface 51 (opposite to the ABS 50) in relation to the MR read head element 42 and the inductive write head element 44.

The heat generated by applying the current to the heating conductive layer 48 is conducted to the thermal expansion layer 47 through the insulating layer 41. The thermal expansion of the thermal expansion layer 47 by the heat extrudes the slider substrate 40 toward the magnetic disk surface. Then, the MR read head element 42 and the inductive write head element 44 are also extruded, and the head end surface adjacent to the head elements is protruded toward the magnetic disk surface. As the result, the magnetic spacing $d_{MS}$ can become smaller. As just described, the magnetic spacing $d_{MS}$ can be fine-adjusted by controlling currents flowing through the heating conductive layer 48.

As described later, the adjustment of the thickness of the insulating layer 41 as the spacer between the thermal expansion layer 47 and the heating conductive layer 48, can control the required electric power applied to the heating conductive layer 48 to obtain the desired protrusion. The heating conductive layer 48 may also be formed directly on the thermal expansion layer 47 without the insulating layer 41.

Here, the effect of the concave portion 46 and the thermal expansion layer 47 will be explained. In the conventional case that the concave portion 46 and the thermal expansion layer 47 is not provided, the heat propagating downward from the heating conductive layer 48 is absorbed in the slider substrate. Then, the slider substrate acts as a heatsink because of relatively high thermal conductance. Therefore, most of the heat generated from the heating conductive layer 48 is dissipated without being utilized for the protrusion of the magnetic head element. On the contrary, in the embodiment of the present invention, the heat propagating downward from the heating conductive layer 48 directly reaches the thermal expansion layer 47 only through the thin insulating layer 41, and surely expands the thermal expansion layer 47. Therefore, the protrusion response of the magnetic head element due to the heat becomes improved more greatly than that of the conventional structure. As the result, the required amount of protrusion of the head end surface can be obtained with the smaller power consumption than the conventional case.

The heating conductive layer 48 may have various shapes such as a meandering line shape, spiral shape and monolayer shape. The heating conductive layer that has a predetermined size and resistance and surely heats the thermal expansion layer is involved in the scope of the present invention. The heating conductive layer 48 that has a meandering line shape will be described later in detail.

In the present embodiment, the upper surface of the thermal expansion layer 47 is a planarized plane with the same height as the surrounding element-formed surface 35, which is formed by chemical mechanical polishing (CMP) method, etc., as described layer. On the contrary, as shown in FIG. 5c, the upper surface of the thermal expansion layer 47' may be below the element-formed surface 35'. In the case, the heating conductive layer 48' is formed directly above the thermal expansion layer 47' through the insulating layer 41', and the lower surface of the heating conductive layer 48' is also below the element-formed surface 35'. It is also possible that the heating conductive layer 48' may be formed directly on the thermal expansion layer 47' without the insulating layer 41'.

As shown in FIG. 5b, a heatsink layer 45 includes a plurality of layers that are formed at the same time as the formations of the lower shield layer 42a, the upper shield layer 42f, and lower magnetic pole layer 44a respectively, and is provided in a position opposite to the head end surface 51 in relation to the upper and lower shield layers and the lower magnetic pole layer. The heatsink layer 45 prevents overheat of the inductive write head element 44 by diffusing the heat generated from the inductive write head element 44 itself to an overcoat layer 49, and controls the heat flow from the heating conductive layer 48 to the magnetic head element.

Next, the above-mentioned structure will be explained in more detail with FIG. 5b. The slider substrate 40 is made of, for example, AlTiC ($Al_2O_3$—TiC) and so on. The concave portion 46 is formed by etching an area on the element-formed surface 35 of the slider substrate 40 with ion-milling technique or reactive ion-etching (RIE) technique, etc. so that the cross-section has a rectangle shape or a trapezoid shape. The etching depth is approximately 0.1 μm to 100 μm. The thermal expansion layer 47 is formed of, for example, $Al_2O_3$, $SiO_2$, or $ZrO_2$, etc., embedded in the concave portion 46. The upper surface of the thermal expansion layer 47 is formed as a planarized plane with the same height as the surrounding element-formed surface 35, by CMP method and so on. Reference numeral 41 indicates an insulating layer with thickness of approximately 0.05 μm to 10 μm formed of, for example, $Al_2O_3$, etc., deposited on the slider substrate 40. The lower shield layer 42a is deposited on the insulating layer 41 and formed of, for example, NiFe, NiFeCo, CoFe, FeN or FeZrN, etc. with thickness of approximately 0.3 μm to 3 μm. Reference numeral 42b indicates a lower shield gap layer with thickness of approximately 0.005 μm to 0.5 μm formed of, for example, $Al_2O_3$ or DLC, etc., deposited on the lower shield layer 42a.

The MR layer 42c is made of, for example, the CIP-GMR multilayer, the CPP-GMR multilayer or the TMR multilayer.

Reference numeral 42d indicates an element lead conductor layer connected to both ends of the MR layer 42c, formed of, for example, Cu, etc. and provided with a magnetic bias layer, and 42e indicates an upper shield gap layer with thickness of approximately 0.005 μm to 0.5 μm formed of, for example, $Al_2O_3$ or DLC, etc., deposited on the MR layer 42c and element lead conductor layer 42d. In the case that the MR layer 42c is made of the CPP-GMR multilayer or the TMR multilayer, the upper and lower shield gap layers 42e and 42b and the element lead conductor layer 42d become unnecessary. The upper shield layer 42f is deposited on the upper shield gap layer 42e and formed of, for example, NiFe, NiFeCo, CoFe, FeN or FeZrN, etc. with thickness of approximately 0.3 μm to 4 μm. A reproducing gap length that is the distance between the upper and lower shield layers 42f and 42a is approximately 0.03 μm to 1 μm.

Reference numeral 43 indicates a non-magnetic layer with thickness of approximately 0.1 μm to 2.0 μm formed of, for example, $Al_2O_3$, etc., deposited on the upper shield layer 42f. The lower magnetic pole layer 44a is deposited on the non-magnetic layer 43 and formed of, for example, NiFe, NiFeCo, CoFe, FeN or FeZrN, etc. with thickness of approximately 0.3 μm to 3 μm. When one magnetic layer is formed instead of the upper shield layer 42f and the lower magnetic pole layer 44a, which serves as these layers, the non-magnetic layer 43 is omitted. Reference numeral 44b indicates a magnetic gap layer with thickness of approximately 0.03 μm to 0.5 μm (equivalent to the recording gap length), formed of, for example, $Al_2O_3$ or DLC, etc., deposited on the lower magnetic pole layer 44a. Reference numerals 44d, 44d' and 44d" indicate coil insulating layers with thickness of approximately 0.1 μm to 5 μm, formed of, for example, a heat-cured resist and so on. The coil layer 44c and 44c' are deposited on the coil insulating layers 44d and 44d' respectively, and formed of, for example, Cu, etc. with thickness of approximately 0.5 μm to 3 μm. Reference numeral 44e indicates a coil lead conductor layer formed of, for example, Cu or NiFe, etc., electrically connected to one end of the coil layer 44c. The upper magnetic pole layer 44f is formed of, for example, NiFe, NiFeCo, CoFe, FeN or FeZrN, etc. with thickness of approximately 0.5 μm to 5 μm, acting as a magnetic pole and a magnetic yoke together with the lower magnetic pole layer 44a.

The heatsink layer 45 is constituted of a plurality of layers that are formed at the same time as the formations of the lower shield layer 42a, the upper and lower shield gap layers 42e and 42b, the upper shield layer 42f, the non-magnetic layer 43 and lower magnetic pole layer 44a respectively. Reference numerals 49a, 49b and 49c are planarizing layers formed of, for example, $Al_2O_3$ and so on, and 49 is an overcoat layer formed of, for example, $Al_2O_3$ and so on, respectively.

The heating conductive layer 48 is deposited on the insulating layer 41 and directly above the thermal expansion layer 47, and has a thickness of, for example, approximately 0.1 μm to 5 μm and is made of, for example, a material containing NiCu, NiCr or Ta, or single Ta. The constituent material and the shape of the heating conductive layer 48 will be described later in detail.

FIG. 6 shows a cross-sectional view taken along line B-B shown in FIG. 4 illustrating a structure of the thin-film magnetic head according to the embodiment shown in FIG. 4. In the figure, the elements common to FIGS. 5a and 5b are designated with the same reference numerals, and the MR layer 42c, the coil lead conductor layer 44e, the concave portion 46, the thermal expansion layer 47, the heating conductive layer 48 and the heatsink layer 45 are not emerged on the cross-section.

FIG. 7 shows a plain view illustrating a structure of the heating conductive layer 48 of the thin-film magnetic head according to the embodiment in FIG. 4.

According to FIG. 7, the heating conductive layer 48 includes a heating portion 48c that consists of one line meandering in layer, and the lead electrodes 48a and 48b that are respectively connected to both ends of the heating portion 48c, constituting a current path of a predetermined length.

More specifically, the heating portion 48c consists of an up-line section 76 formed so as to meander in a square wave form from a predetermined starting point 70 to a turn-round 71, a down-line section 77 formed so as to return from the turn-round 71 to an end point 72 close to the starting point 70 meandering along the up-line section 76, a connection section 74 that connects the starting point 70 and the lead electrode 48a, and a connection section 75 that connects the end point 72 and the lead electrode 48b. The distance $W_1$ between the up-line section 76 and the down-line section 77 formed so as to run along each other is set to be narrower than the distance $W_2$ between the mutually facing parts of the up-line section 76 and the distance $W_3$ between the mutually facing parts of the down-line section 77.

The heating portion 48c has a thickness of, for example, approximately 0.1 μm to 5 μm and is made of, for example, a material containing NiCu. The content of Ni in this NiCu is, for example, approximately 15 to 60 atomic % and preferably 25 to 45 atomic %. Furthermore, at least one of elements Ta, Al, Mn, Cr, Fe, Mo, Co, Rh, Si, Ir, Pt, Ti, Nb, Zr and Hf may be contained as an additive to this NiCu. The content of this additive is preferably 5 atomic % or less.

Furthermore, the heating portion 48c may also be made of a material containing NiCr. In this case, the content of Ni in this NiCr is approximately 55 to 90 atomic % and preferably 70 to 85 atomic %. Furthermore, at least one of elements Ta, Al, Mn, Cu, Fe, Mo, Co, Rh, Si, Ir, Pt, Ti, Nb, Zr and Hf may also be included as an additive to this NiCr. The content of the additive is preferably 5 atomic % or less.

Furthermore, the heating portion 48c may also be made of single Ta or a material containing Ta. Here, at least one of elements Al, Mn, Cu, Cr, Fe, Mo, Co, Rh, Si, Ir, Pt, Ti, Nb, Zr and Hf may also be included as an additive to this Ta. The content of the additive is preferably 5 atomic % or less. In addition, the lead electrodes 48a and 48b may also be made of the same material as that of the heating portion 48c.

FIG. 8 shows a cross-sectional view taken along line C-C in FIG. 4 illustrating a structure of the drive electrodes 33 and 34 for the heating conductive layer 48.

According to FIG. 8, the lead electrodes 48a and 48b extracted from the heating conductive layer 48 are emerged on the cross-section. The base electrode films 80a and 80b with conductivity are formed on the lead electrodes 48a and 48b respectively. Bumps 81a and 81b extending upward which are formed by electrolytic plating using the base electrode films 80a and 80b as electrodes are provided on the base electrode films 80a and 80b respectively. The base electrode films 80a and 80b, and bumps 81a and 81b are made of a conductive material such as Cu. The thickness of the base electrode films 80a and 80b is approximately 10 nm to 200 nm and the thickness of the bumps 81a and 81b is approximately 5 μm to 30 μm.

The top ends of the bumps 81a and 81b are exposed from the overcoat layer 49, and pads 82a and 82b are provided on these top ends. These above-described elements constitute the drive electrodes 33 and 34. Electric currents are supplied to the heating conductive layer 48 through the drive electrodes 33 and 34. Likewise, the MR read head element 42 and the inductive write head element 44 are connected to the signal electrodes 31 and 32 (FIG. 3). However, the connection structure of these elements is not shown for simplicity of drawings.

FIGS. 9a to 9d show cross-sectional views taken along line A-A in FIG. 4 explaining the manufacturing process of the thin-film magnetic head according to the embodiment shown in FIG. 4.

Figure 9A:
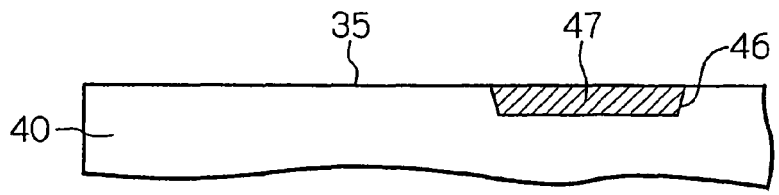
FIGS. 9a to 9d show cross-sectional views taken along line A-A in FIG. 4 explaining the manufacturing process of the thin-film magnetic head according to the embodiment shown in FIG. 4.

Hereinafter, the manufacturing process of the thin-film magnetic head according to the embodiment will be explained briefly with reference to the figures. First, as shown in FIG. 9a, the concave portion 46 is formed by etching an area on the element-formed surface 35 of the slider substrate 40 by use of ion-milling technique or RIE technique, etc. with a resist pattern as a mask so that the cross-section of the concave portion has a rectangle shape or a trapezoid shape, and then removing the resist pattern. Next, a film is deposited by, for example, sputtering technique so as to form the thermal expansion layer 47 that is embedded in the concave portion 46. Then, the thermal expansion layer 47 is formed by polishing the upper surface of the film with the use of, for example, CMP method so that the upper surface becomes a planarized plane with the same height as the surrounding element-formed surface 35.

Figure 9B:
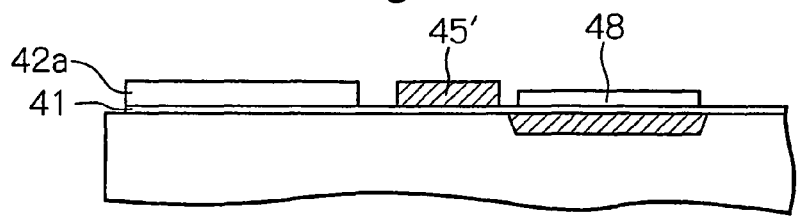

Then, as shown in FIG. 9b, an insulating layer 41 is deposited on the element-formed surface 35 and the planarized upper surface of the thermal expansion layer 47 using, for example, sputtering technique. Next, the lower shield layer 42a and a part of the heatsink layer 45' are formed on the insulating layer 41 using, for example, plating technique and photolithographic method. And then, the heating portion 48c and the lead electrodes 48a and 48b constituting the heating conductive layer 48 are formed directly above the thermal expansion layer 47 and on the insulating layer 41 opposite to the head end surface 51 in relation to the lower shield layer 42a, using, for example, sputtering technique and photolithographic method.

Figure 9C:
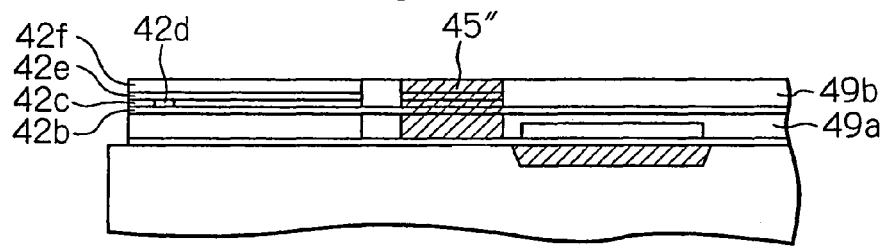

Next, as shown in FIG. 9c, the planarized layer 49a is formed so as to cover the heating conductive layer 48. Then, the lower shield gap layer 42b, the MR layer 42c, the element lead conductor layer 42d provided with the magnetic bias layer, and the upper shield gap layer 42e are formed sequentially using, for example, sputtering technique and photolithographic method. Then, the upper shield layer 42f and a part of the heatsink layer 45" are formed using, for example, plating technique and photolithographic method, and then a planarizing layer 49b is formed. The formation of the MR read head element 42 is completed through the above-described process.

Figure 9D:
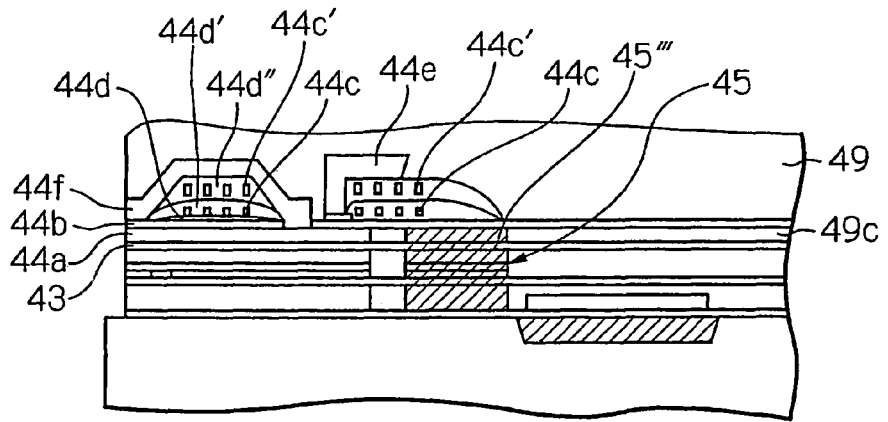

Next, as shown in FIG. 9d, the non-magnetic layer 43 is deposited on the upper shield layer 42f and the planarized layer 49b using, for example, a sputtering technique. Then, the lower magnetic pole layer 44a and a part of the heatsink layer 45''' are formed using common techniques such as a sputtering technique, a photolithographic method and a dry-etching method. The formation of the heatsink layer 45 is completed at this step. After that, the planarized layer 49c is formed.

Next, the magnetic gap layer 44b is formed on the lower magnetic pole layer 44a and a part of the heatsink layer 45''' using, for example, a sputtering technique and a photolithographic method. Further, by using common techniques such as a photolithographic method and a dry-etching method, the coil insulating layer 44d, the coil layer 44c, the coil insulating layer 44d', the coil layer 44c' and the coil insulating layer 44d" are formed sequentially on the magnetic gap layer 44b. And then, the upper magnetic pole layer 44f and a coil lead conductive layer 46e are formed. The formation of the inductive write head element 44 is completed through the above-described process. After the formation, the overcoat layer 49 is formed so as to cover the head elements.

Figure 10:
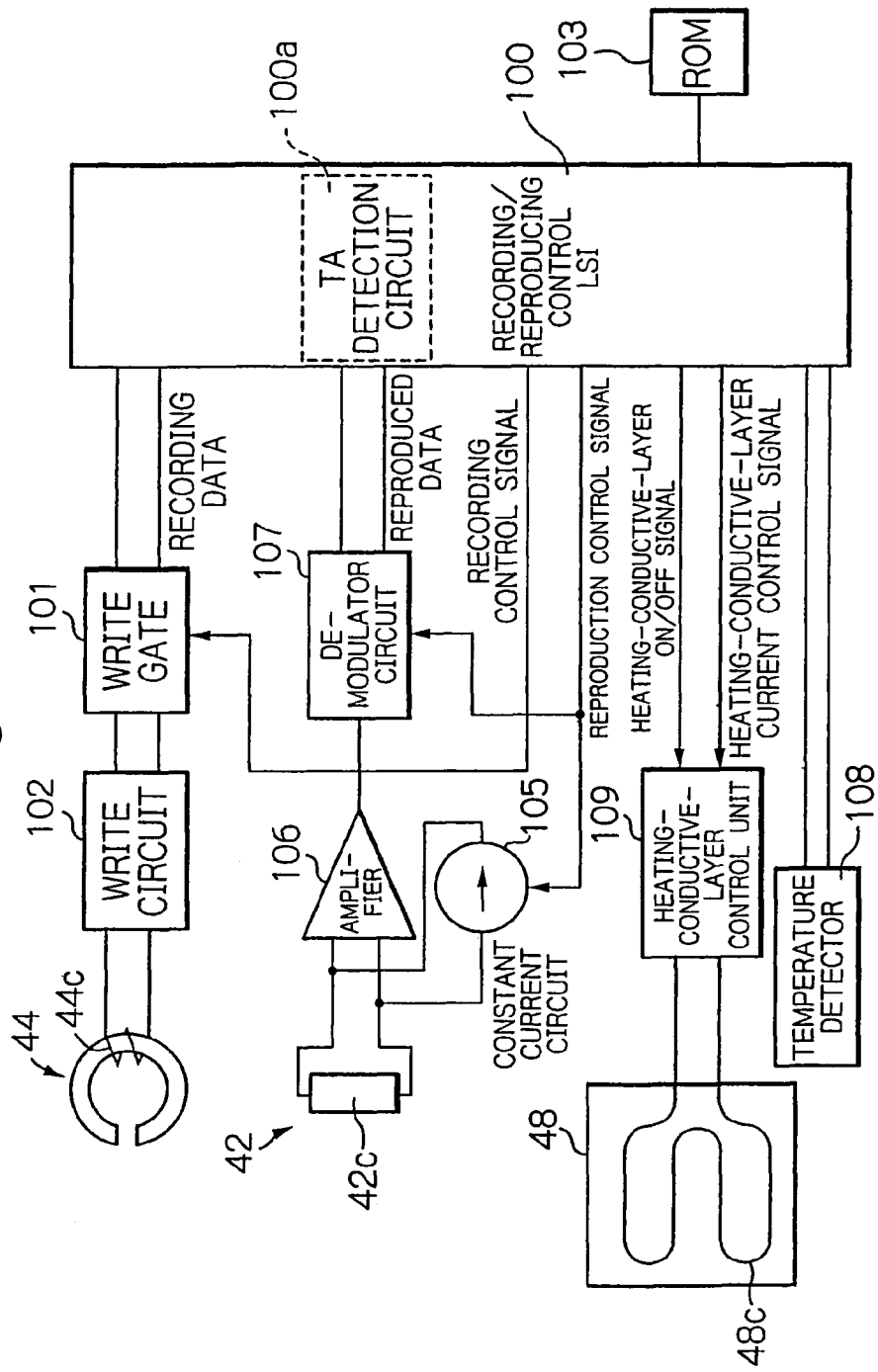
FIG. 10 shows a block diagram illustrating the circuit structure of the recording/reproducing and heating control circuit of the magnetic disk drive apparatus according to the embodiment in FIG. 1.
Figure 11:
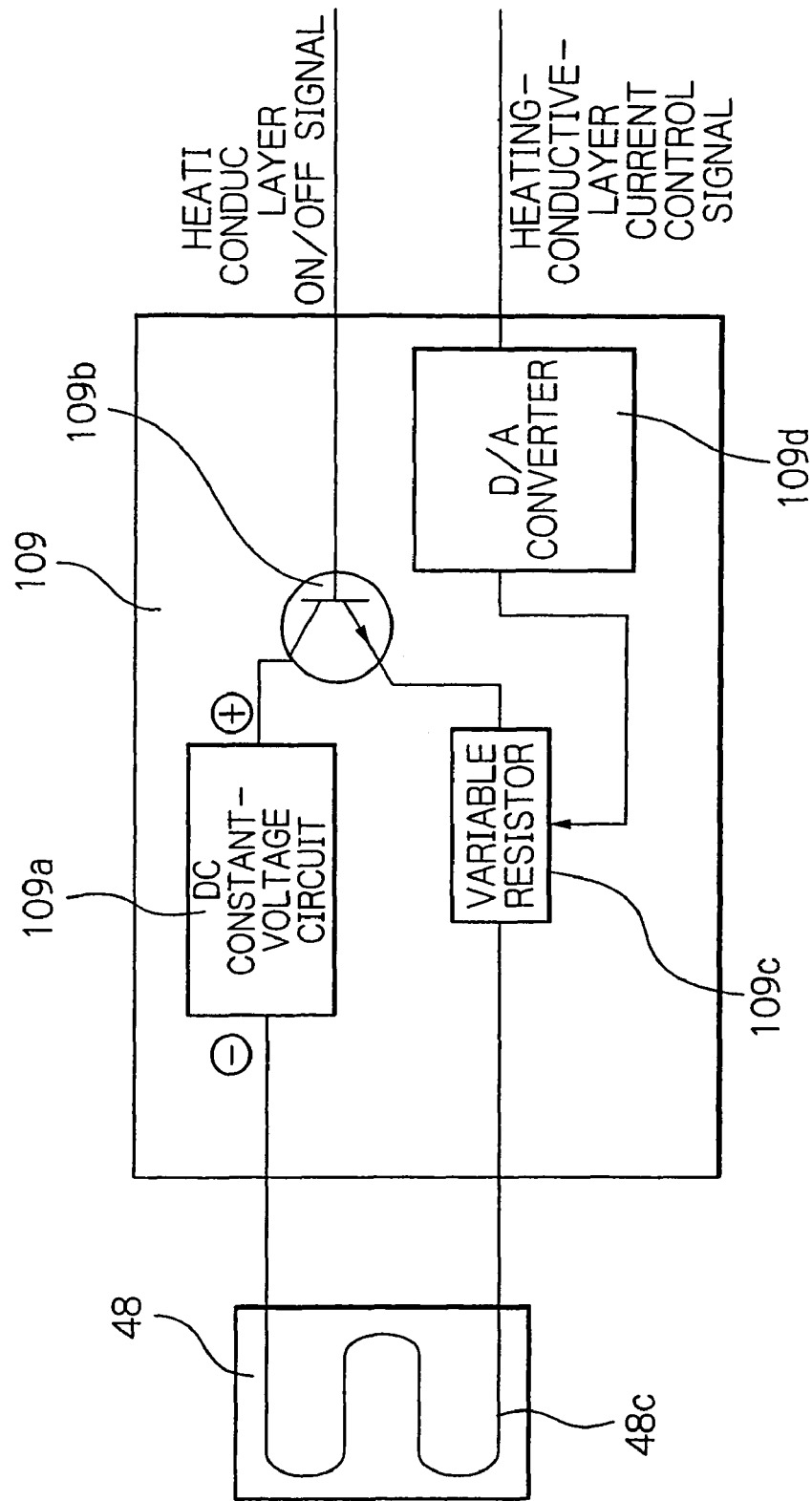
FIG. 11 is a block diagram showing the structure of the heating-conductive-layer control circuit of the magnetic disk drive apparatus according to the embodiment in FIG. 1.

FIG. 10 shows a block diagram illustrating the circuit structure of the recording/reproducing and heating control circuit 13 of the magnetic disk drive apparatus according to the embodiment in FIG. 1. Furthermore, FIG. 11 is a block diagram showing the structure of the heating-conductive-layer control circuit of the magnetic disk drive apparatus according to the embodiment in FIG. 1.

In FIG. 10, reference numeral 100 indicates a recording/reproducing control LSI provided with a thermal asperity (TA) detection circuit 100*a*, 101 indicates a write gate that receives recording data from the recording/reproducing control LSI 100, 102 indicates a write circuit, 103 indicates a ROM that stores a table and so on for controlling current values to the heating conductive layer 48, 105 indicates a constant current circuit that supplies a sense current to the MR read head element 42, 106 indicates an amplifier that amplifies the output voltage of the MR read head element 42, 107 indicates a demodulator circuit that outputs reproduced data to the recording/reproducing control LSI 100, 108 indicates a temperature detector, and 109 indicates a control unit of the heating conductive layer 48, respectively.

The recording data that is output from the recording/reproducing control LSI 100 is supplied to the write gate 101. The write gate 101 supplies recording data to the write circuit 102 only when a recording control signal that is output from the recording/reproducing control LSI 100 instructs a write operation. The write circuit 102 passes a write current through the coil layer 44*c* corresponding to this recording data, and the inductive write head element 44 writes data on the magnetic disk.

A constant current flows from the constant current circuit 105 into the MR layer 42*c* only when the reproduction control signal that is output from the recording/reproducing control LSI 100 instructs a read operation. The signal reproduced by this MR read head element 42 is amplified by the amplifier 106 and demodulated by the demodulator circuit 107, and then, the obtained reproduced data is output to the recording/reproducing control LSI 100.

The heating-conductive-layer control circuit 109 according to this embodiment has a structure shown in FIG. 11. That is, a series circuit made up of a direct-current (DC) constant-voltage circuit 109*a*, a switching transistor 109*b* and variable resistor 109*c* is connected to the heating portion 48*c* of the heating conductive layer 48. A heating-conductive-layer ON/OFF signal that is output from the recording/reproducing control LSI 100 is supplied to the switching transistor 109*b*. Furthermore, a heating-conductive-layer current control signal that is also output from the recording/reproducing control LSI 100 is converted to an analog signal at a D/A converter (digital-analog converter) 109*d* and supplied to the variable resistor 109*c*.

When the heating-conductive-layer ON/OFF signal is an ON operation instruction, the switching transistor 109*b* turns ON and a current flows into the heating portion 48*c*. The current value in this case is controlled by the variable resistor 109*c* to a value corresponding to the heating-conductive-layer current control signal converted to the analog signal.

Thus, it is possible to utilize more diversified current application modes and to realize more appropriate controls of the magnetic spacing $d_{MS}$ by providing the system of the heating-conductive-layer ON/OFF signals and the heating-conductive-layer current control signal, independently from the recording/reproducing control signal system.

In the actual operation, a current corresponding to a predetermined current application mode considering the timing of write and read operations, flows through the heating conductive layer 48. The heat is generated from the heating conductive layer 48 by the current and expands the thermal expansion layer 47, and therefore, the slider substrate 40. As the result, the head end surface adjacent to the end of the MR read head element 42 and the inductive write head element 44 is protruded toward the magnetic disk surface. This allows the magnetic spacing $d_{MS}$ to be reduced only when writing and reading data. Thus, the controlling of the magnetic spacing $d_{MS}$ only when necessary in the operation period of the magnetic head element makes it possible to obtain the desired $d_{MS}$ value without considerably increasing the probability that the slider may crash into the magnetic disk surface. The $d_{MS}$ value can be adjusted precisely by using the heating-conductive-layer current control signal.

It is obvious that the circuit structure of the recording/reproducing and heating control circuit 13 is not limited to that shown in FIGS. 10 and 11. It is also possible to specify the write and read operations using a signal other than the recording/reproducing control signal. The heating by the heating-conductive layer 48 may be performed only when either writing or reading, or only in a predetermined period. Furthermore, it is also possible to use not only DC but also AC or pulse current, etc., as the currents flowing through the heating conductive layer 48.

An embodiment of a current application mode for the heating conductive layer 48 will be explained below.

First, an initial setting of the electric power supplied to the heating conductive layer 48 for controlling the magnetic spacing $d_{MS}$ will be explained. The $d_{MS}$ value of the individual thin-film magnetic head generally varies. Correspondingly, the acoustic emission (AE) component in the reproduced data on the innermost track of the magnetic disk is detected by the TA detecting circuit 100*a*, the heating conductive layer 48 is energized up to the amount of current at which AE is beyond a reference range. And then, the amount of limit current is determined, and is recorded in the ROM 103. The reason that the innermost track is used is that the magnetic spacing $d_{MS}$ during seek is smallest in the innermost radius and therefore the AE component on the innermost track can be a reference for the upper limit of the amount of current. Then, the amount of current corresponding to a desired $d_{MS}$ is set using a common "current vs. the amount of TPTP protrusion" table recorded in the ROM 103.

Next, a power supply during normal operation of the magnetic disk drive apparatus will be explained. First, with the heating conductive layer 48 energized with the amount of current that is set as described above, writing and reading are performed. Here, when the amount of generated AE is within a reference range, the operation is continued. When the amount of generated AE exceeds the reference range, the current is reduced by a predetermined unit and the amount of generated AE is monitored continuously. Thereafter, this cycle is repeated. In this case, if the amount of generated AE exceeds the reference range even after the predetermined number of repetitions, the flying state of the head may be unstable or it may be considered as a sign of a crash, and a flag of stopping operation is notified to the host CPU.

Then, temperature compensation of the magnetic spacing $d_{MS}$ will be explained. Since the slider flies hydrodynamically, a temperature inside the apparatus affects the magnetic spacing $d_{MS}$. Furthermore, the temperature also affects the amount of protrusion of the magnetic head element due to the TPTP phenomenon. Therefore, a "temperature inside the apparatus vs. change in the magnetic spacing $d_{MS}$" table based on the characteristic of the temperature detector 108 (e.g., resistor type sensor) and the amount of TPTP protrusion, is stored in the ROM 103 and the temperature is monitored by the temperature detector 108. According to the temperature inside the apparatus, the amount of current is adjusted with reference to this table and a constant $d_{MS}$ value is secured.

Next, the compensation of the magnetic spacing $d_{MS}$ according to other factors will be explained. The $d_{MS}$ value also fluctuates due to a variation in an atmospheric pressure or external vibration. However, there is normally no barometric sensor or vibration sensor inside the magnetic disk drive apparatus. Therefore, first, the $d_{MS}$ value is adjusted based on the temperature inside the apparatus. After this adjustment, if the amount of generated AE is still beyond the reference range, this is considered to be a magnetic spacing $d_{MS}$ variation due to barometric variation or vibration, etc., and the current supplied to the heating conductive layer is reduced by a first predetermined amount. Here, if the amount of generated AE is still beyond the reference range, the current is reduced by a second predetermined amount. Hereafter, this cycle is repeated. In this case, if the amount of generated AE exceeds the reference range even after the predetermined number of repetitions, this is considered to be attributable to an unstable flying state of the head or a sign of a crash and a flag of stopping operation, etc., is notified to the host CPU.

Furthermore, the $d_{MS}$ value also varies depending on the position in the magnetic disk. This is because the disk-moving speed differs between the inner radius side and outer radius side even if the number of revolutions is the same. Therefore, it is possible to perform fine adjustment of the current supplied to the heating conductive layer 48 according to the radius of the recording/reproducing position in the magnetic disk to stabilize the $d_{MS}$ Value.

Furthermore, in the usage for a vehicle-mounted apparatus such as a car navigation system, it is possible to set current application to a save mode considering a strong vibration mode (frequent AE mode) and take a sufficiently large $d_{MS}$ value.

Hereinafter, the effect of reducing the applied power for controlling the magnetic spacing $d_{MS}$ in the thin-film magnetic head according to the present invention will be explained. Especially, the effect of size and position of the heating conduction layer and the concave portion (the thermal expansion layer) on the required amount of power applied to the heating conductive layer for obtaining the predetermined $d_{MS}$ will be explained.

Figure 12A:
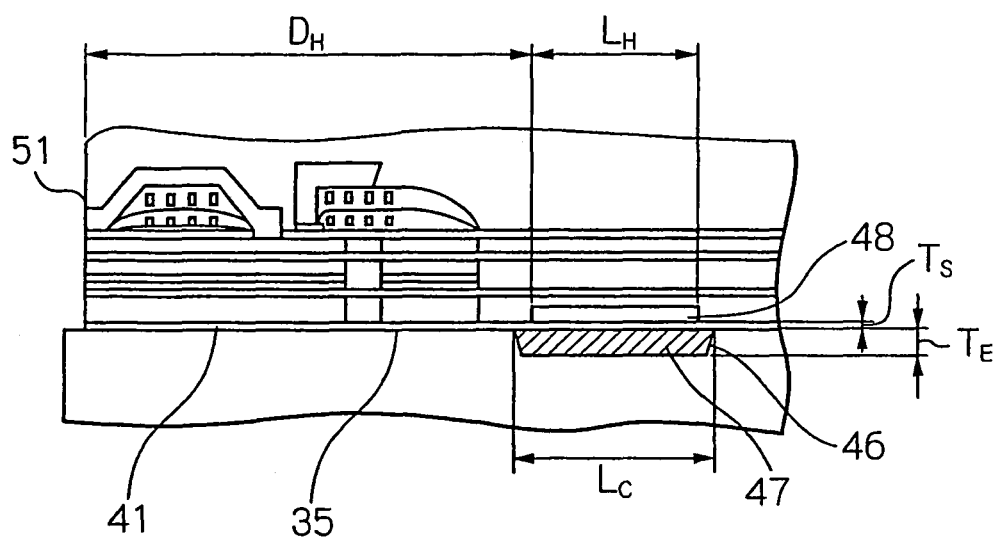
FIG. 12a shows a cross-sectional view taken along the line A-A shown in FIG. 4 explaining parameters indicating size and position of the heating conduction layer and the concave portion (the thermal expansion layer)
Figure 12B:
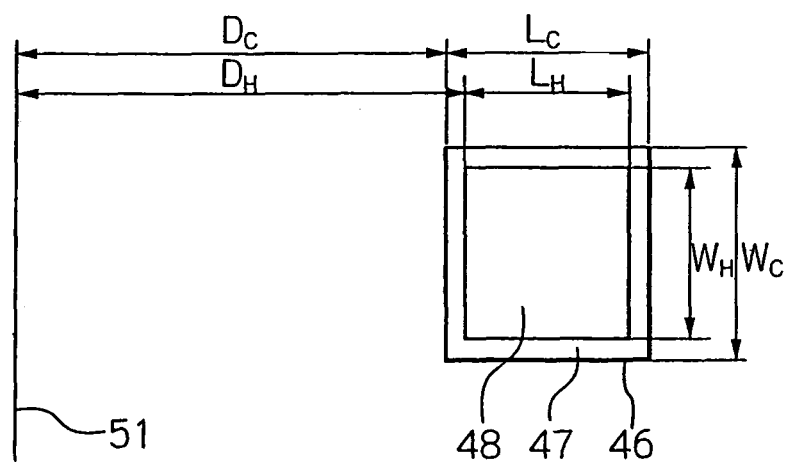
FIG. 12b shows a plain view explaining the parameters.

FIG. 12a shows a cross-sectional view taken along the line A-A shown in FIG. 4 explaining parameters indicating size and position of the heating conduction layer 48 and the concave portion 46 (the thermal expansion layer 47). FIG. 12b shows a plain view explaining the parameters.

According to FIGS. 12a and 12b, a $L_H$ is defined as a pattern length of the heating conductive layer 48 in the direction perpendicular to the head end surface 51, a $W_H$ is defined as a pattern length of the heating conductive layer 48 in the track-width direction (parallel with the head end surface 51), and a $D_H$ is defined as a distance between the head end surface 51 and the edge of the heating conductive layer 48 on the side of the head end surface 51. Further, a $L_C$ is defined as a length of the concave portion 46 in the direction perpendicular to the head end surface 51, and a $D_C$ is defined as a distance between the head end surface 51 and the edge of the concave portion 46 on the side of the head end surface 51. Furthermore, a $T_E$ is defined as a depth from the element-formed surface 35 of the concave portion 46, in other words, the thickness of the heating conductive layer 47, and a $T_S$ is defined as a distance between the heating conductive layer 48 and the thermal expansion layer 47, in other words, the thickness of the insulating layer 41. The relation between these parameters and the required amount of power applied to the heating conductive layer 48 for obtaining the predetermined $d_{MS}$ will be explained below.

Figure 13:
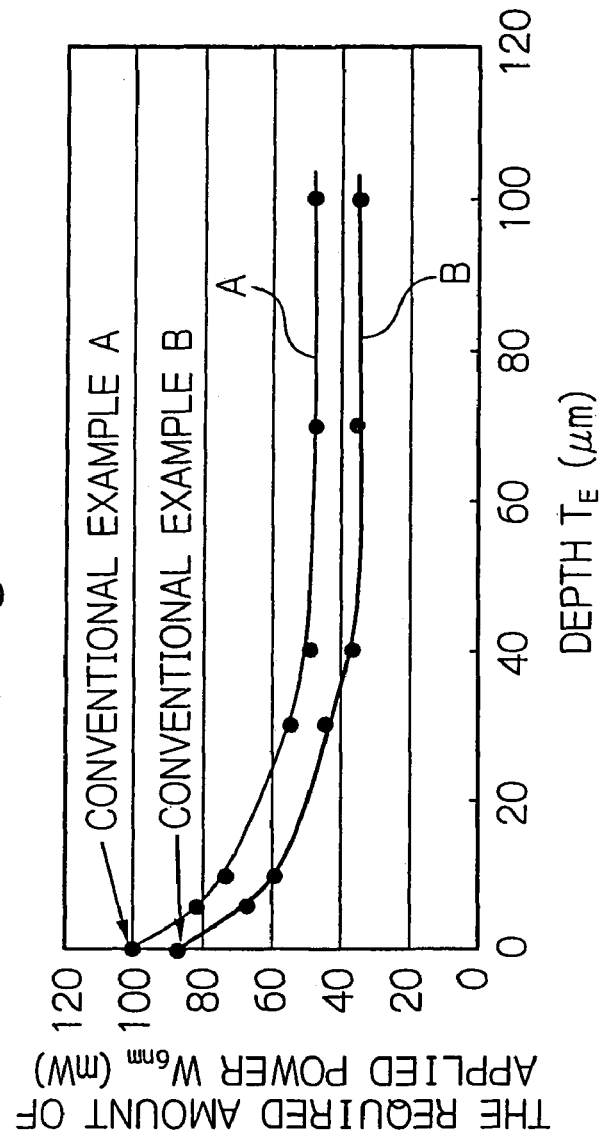
FIG. 13 shows a graph illustrating the relation between the depth $T_E$ and the required amount of electric power $W_{6nm}$ in the thin-film magnetic heads that have the heating conductive layers with different two sizes from each other.

FIG. 13 shows a graph illustrating the relation between the depth $T_E$ and the required amount of electric power in the thin-film magnetic heads that have the heating conductive layers with different two sizes from each other. Here, a heating conductive layer A has a size that $L_H$=30.0 μm and $W_H$=80.0 μm. A heating conductive layer B has a size that $L_H$=30.0 μm and $W_H$=30.9 μm, that is, smaller area than the heating conductive layer A. Both of the heating conductive layers A and B have parameters that $D_H$=55.0 μm and $T_S$=0.3 μm. The concave portion has parameters that $W_C$=100.0 μm, $L_C$=62.0 μm and $D_C$=43.0 μm. A $W_{6nm}$, which is the amount of the vertical axis of the graph, is defined as a required amount of electric power for the end surface of the MR read head element to protrude by 6 nm.

As shown in the figure, each $W_{6nm}$ of the heating conductive layers A and B decreases as the $T_E$ increases, and becomes almost constant in the region that $T_E$ is 40.0 μm or more. Here, conventional examples A and B are defined as the cases with no concave portion ($T_E$=0 μm) in the heating conductive layers A and B respectively, corresponding to the leftmost data points. Each $W_{6nm}$ becomes smaller than the conventional examples A and B in the region that $T_E$ is 6 μm or more, and especially, becomes significantly smaller in the region that $T_E$ ranges from 40.0 μm to 100 μm. Even in the case that $T_E$=0.1 μm, the formed concave portion effects the decrease in the $W_{6nm}$ compared with the conventional example, and the depth of the concave portion in the case is also involved in the scope of the present invention. Furthermore, even in the region that $T_E$ is more than 100 μm, it is recognized that the $W_{6nm}$ does not decrease more, though more process time is needed.

Table 1 illustrates the observed $W_{6nm}$ values of the heating conductive layers A and B in the case that $T_E$=40.0 μm. The above conventional example B is used as a standard of comparison between the heating conductive layers A and B.

TABLE 1

|  | $W_{6\,nm}$ (mW) | Ratio of $W_{6\,nm}$ to conventional example B |
|---|---|---|
| Conventional example B | 87 |  |
| Heating conductive layer A | 49 | 56% (reduced by 44%) |
| Heating conductive layer B | 36 | 41% (reduced by 59%) |

According to the table, the $W_{6nm}$ values of the heating conductive layers A and B as the embodiments according to the present invention are reduced by approximately 44% and 59% compared with the conventional example B respectively. Therefore, the existence of the concave portion and the thermal expansion layer results in a reduction in the power consumption, and especially, the depth $T_E$ of the concave portion that is at least 40.0 μm effects a significant reduction in the power consumption. It is also noticed that the heating conductive layer B that has smaller size shows more significant reduction in the power consumption.

Figure 14:
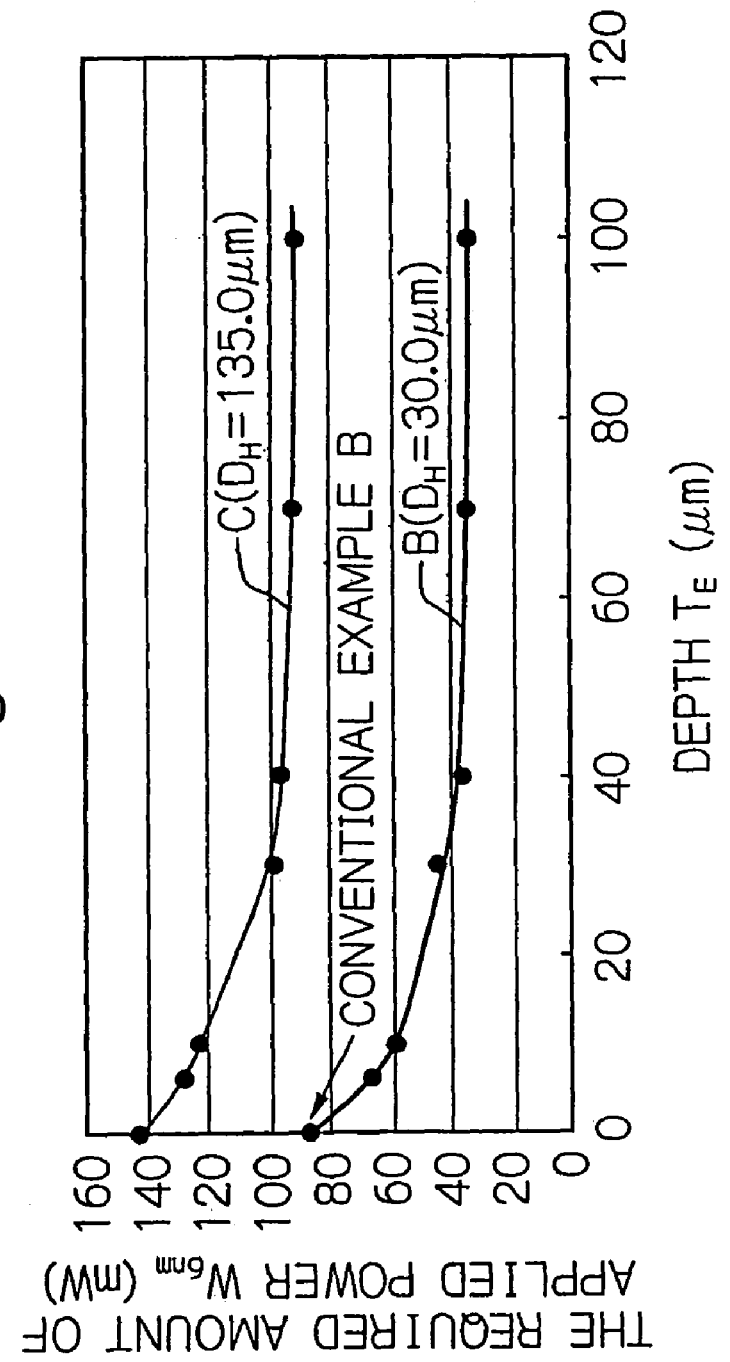
FIG. 14 shows a graph illustrating the relation between the depth $T_E$ and the required amount of power $W_{6nm}$ in the thin-film magnetic head that has the heating conductive layer C provided in a position further from the head end surface than the heating conductive layers A and B.

FIG. 14 shows a graph illustrating the relation between the depth $T_E$ and the required amount of power $W_6$, in the thin-film magnetic head that has the heating conductive layer C provided in a position further from the head end surface than the heating conductive layers A and B. For comparison, the curve corresponding to the thin-film magnetic head with the heating conductive layer B (the same as the curve B shown in FIG. 13) is shown in the figure. The heating conductive layer C has partially the same parameters that $L_H=30.0$ μm, $W_H=30.9$ μm and $T_S=0.3$ μm as the heating conductive layer B. However, the heating conductive layer C has the distance from the head end surface that $D_H=135.0$ μm, therefore is further from the head end surface, that is, the magnetic head element than the heating conductive layer B ($D_H=55.0$ μm). The concave portion has parameters that $W_C=100.0$ μm, $L_C=62.0$ μm and $D_C=43.0$ μm.

As shown in the figure, the $W_{6nm}$ of the heating conductive layer C decreases as the $T_E$ increases, and becomes almost constant in the region that $T_E$ is 40.0 μm or more, in the same way as FIG. 13. However, the $W_{6nm}$ becomes even larger in the present $T_E$ range than the conventional example B ($D_H=55.0$ μm). As just described, in the case that the heating conductive layer is much further from the magnetic head element ($D_H=135.0$ μm), the existence of the concave portion and the thermal expansion layer also results in the reduction in the power consumption. However, the value of the power consumption becomes larger than that in the case of appropriately nearer distance ($D_H=55.0$ μm). Therefore, it is understood that the appropriately nearer distance from the magnetic head element as in the case of the heating conductive layers A and B shown in FIG. 13 effects a significant reduction in the power consumption.

Figure 15:
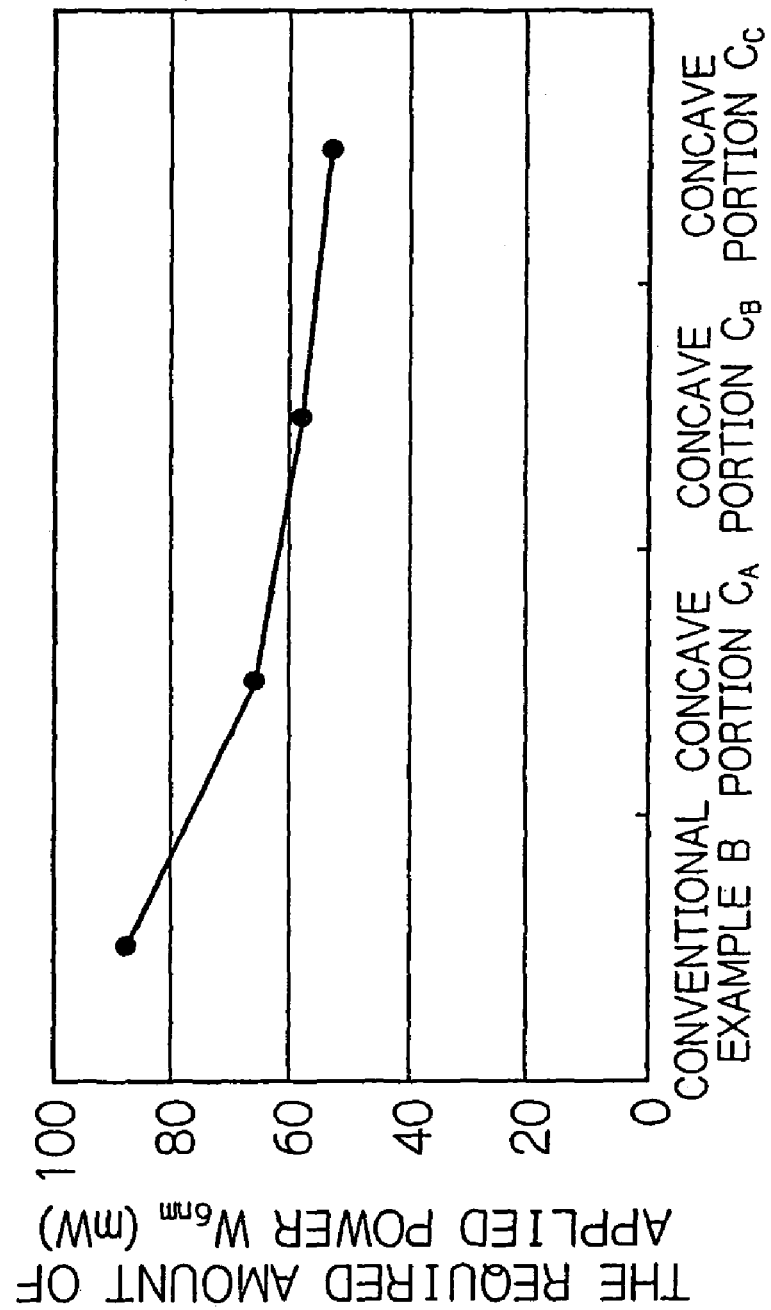
FIG. 15 shows a graph illustrating the relation between the size of the concave portion and the required amount of power $W_{6nm}$ in the thin-film magnetic heads that have the concave portions $C_A$, $C_B$ and $C_C$ with different three sizes among them.

FIG. 15 shows a graph illustrating the relation between the size of the concave portion and the required amount of power $W_{6nm}$ in the thin-film magnetic heads that have the concave portions $C_A$, $C_B$ and $C_C$ with different three sizes among them. The concave portion $C_A$ has parameters that $W_C=40.0$ μm, $L_C=40.0$ μm and $D_C=50.0$ μm, the concave portion CB has parameters that $W_C=100.0$ μm, $L_C=62.0$ μm and $D_C=43.0$ μm, and the concave portion $C_C$ has parameters that $W_C=100.0$ μm, $L_C=100.0$ μm and $D_C=28.0$ μm. The areas in the element-formed surface of the concave portions $C_A$, $C_B$ and $C_C$ become larger in this order. In each concave portion, the depth $T_E$ is 10.0 μm. Each heating conductive layer has same parameters that $L_H=30.0$ μm and $W_H=30.9$ μm, $D_H=55.0$ μm and $T_S=0.3$ μm as the heating conductive layer B.

As shown in the figure, the $W_{6nm}$ values of the concave portions $C_A$, $C_B$ and $C_C$ become smaller than the conventional example B, and decreases as the size of the concave portion increases.

Table 2 illustrates the observed $W_{6nm}$ values shown in FIG. 15.

TABLE 2

|   | $W_{6\,nm}$ (mW) | Ratio of $W_{6\,nm}$ to conventional example B |
|---|---|---|
| Conventional example B | 87 |   |
| Concave portion A | 66 | 76% (reduced by 24%) |
| Concave portion B | 58 | 67% (reduced by 33%) |
| Concave portion C | 53 | 61% (reduced by 39%) |

According to the table, the $W_{6nm}$ values of the concave portions $C_A$, $C_B$ and $C_C$ as the embodiments according to the present invention are reduced by approximately 24%, 33% and 39% compared with the conventional example B respectively. Therefore, it is clarified that the size of the concave portion ranging in the figure effects a significant reduction in the power consumption. It is also noticed that the larger the size is, the more significant the reduction is.

However, in yet another larger concave portion, a part of the concave portion is actually likely to be positioned directly below the magnetic head element, especially, below the inductive write head element. The larger the part becomes, the more the amount of TPTP phenomenon originating from the heat generated from the inductive write head element increases. In order to realize the sure controlling of the magnetic spacing $d_{MS}$ by using TPTP phenomenon originating from the heating conductive layer, it is preferable that the TPTP phenomenon originating from the inductive write head element is limited. Therefore, the size of the concave portion is actually determined by compromise between the required amount of reduction in the power consumption and the acceptable amount of the TPTP phenomenon originating from the inductive write head element.

Figure 16:
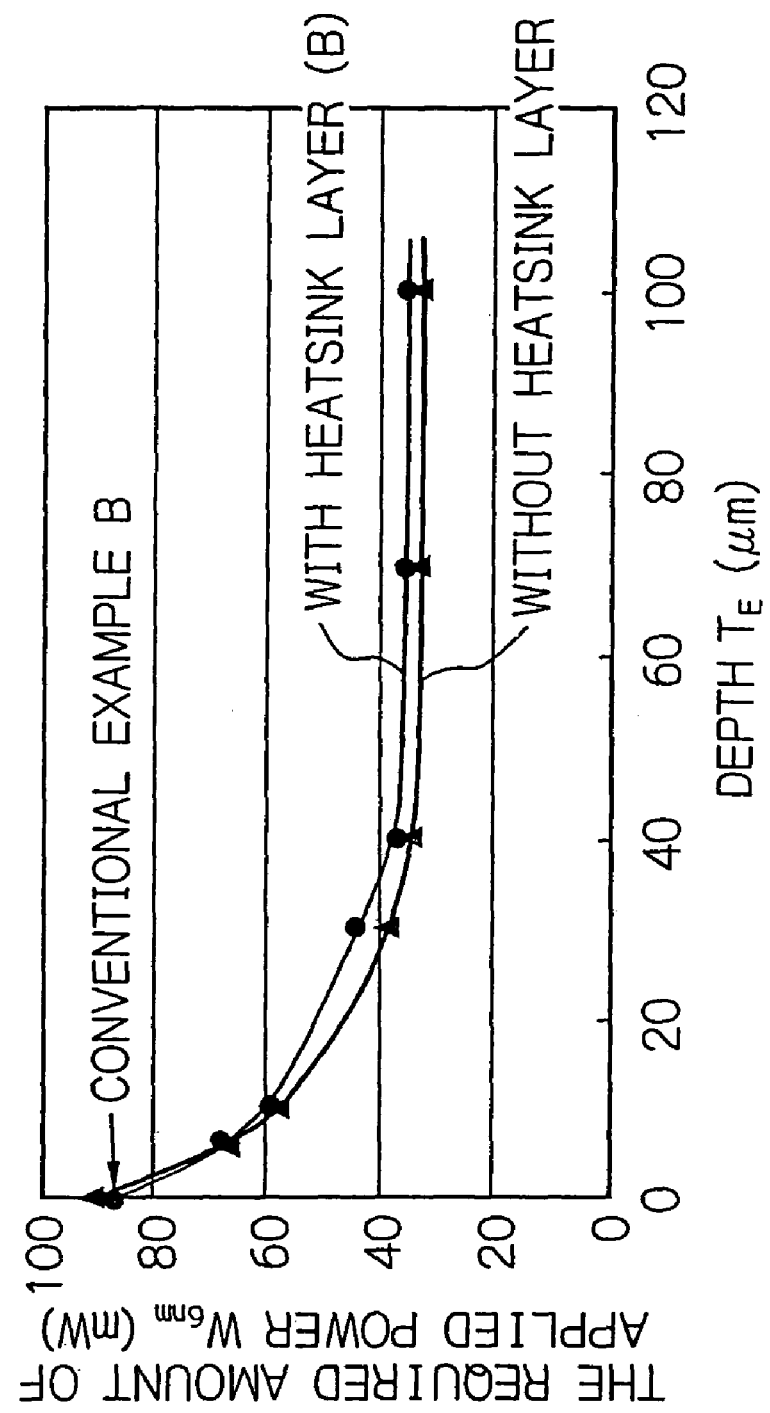
FIG. 16 shows a graph illustrating the relation between the depth $T_E$ and the required amount of power $W_{6nm}$ in the thin-film magnetic head without the heatsink layer.

FIG. 16 shows a graph illustrating the relation between the depth $T_E$ and the required amount of power $W_{6nm}$ in the thin-film magnetic head without the heatsink layer. For comparison, the curve corresponding to the thin-film magnetic head with the heatsink layer (the same as the curve B shown in FIG. 13) is shown in the figure. The heating conductive layer has the same parameters that $L_H=30.0$ μm, $W_H=30.9$ μm, $D_H=55.0$ μm and $T_S=0.3$ μm as the heating conductive layer B. The concave portion has parameters that $W_C=100.0$ μm, $L_C=62.0$ μm and $D_C=43.0$ μm.

As shown in the figure, the $W_{6nm}$ in the case without the heatsink layer decreases as the $T_E$ increases, and becomes almost constant in the region that $T_E$ is 40.0 μm or more, in the same way of the case with the heatsink layer. The $W_{6nm}$ becomes significantly smaller in the region that $T_E$ is 40.0 μM or more, when compared with that of the conventional example B.

Table 3 illustrates the observed $W_{6nm}$ values in the case with/without the heatsink layer, and the depth $T_E$ is 40.0 μm.

TABLE 3

|   | $W_{6\,nm}$ (mW) | Ratio of $W_{6\,nm}$ to conventional example B |
|---|---|---|
| Conventional example B | 87 |   |
| Without heatsink layer | 35 | 40% (reduced by 60%) |
| With heatsink layer | 36 | 41% (reduced by 59%) |

According to the table, the $W_{6nm}$ value in the case without the heatsink layer are reduced by approximately 60% compared with the conventional example B, and therefore, the almost same effect reducing the power consumption as the case with the heatsink layer is obtained. From the result, it is considered that, in the thin-film magnetic head according to the present invention, the protrusion of the magnetic head element is mainly caused by the action of the thermal expansion layer embedded in the concave portion and the slider substrate provided with the concave portion, and the power consumption is not so influenced by existence or nonexistence of the heatsink layer.

Figure 17:
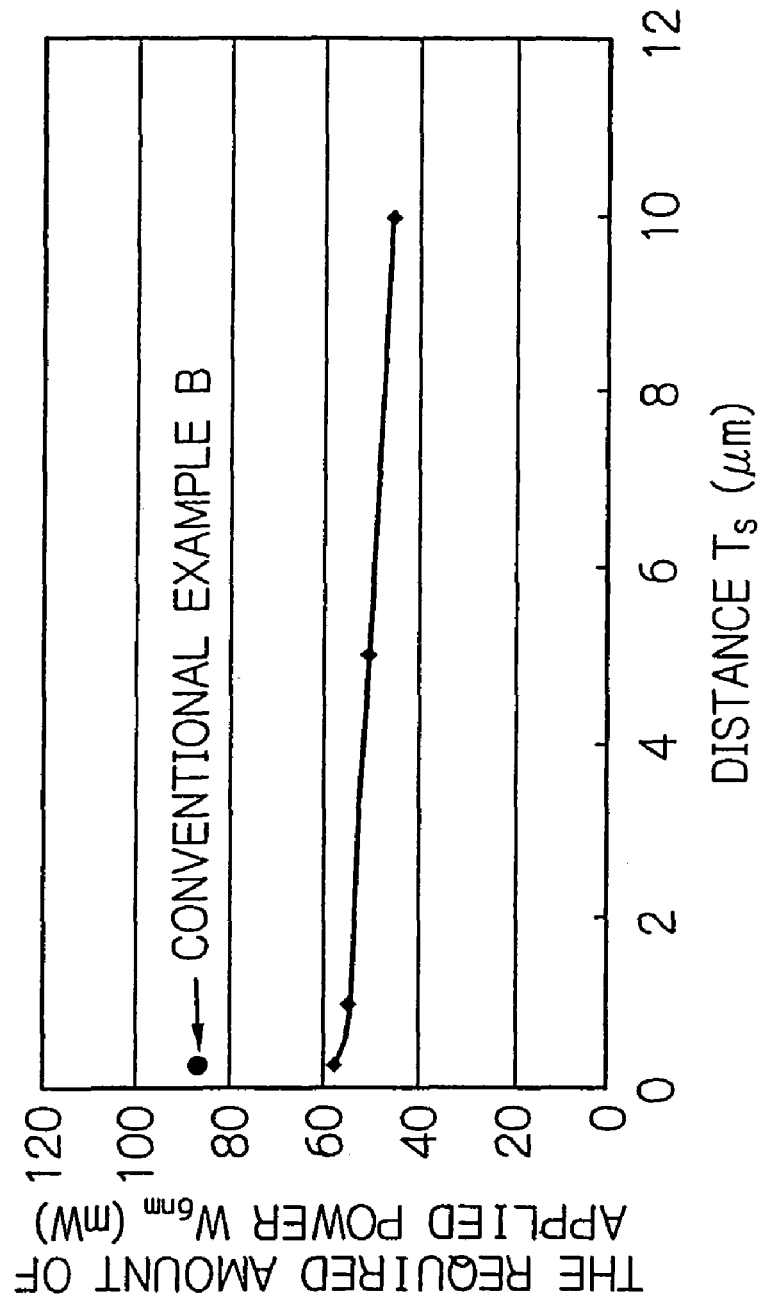
FIG. 17 shows a graph illustrating the relation between the distance $T_S$ from the heating conductive layer to the thermal expansion layer and the required amount of power $W_{6nm}$.

FIG. 17 shows a graph illustrating the relation between the distance $T_S$ from the heating conductive layer to the thermal expansion layer and the required amount of power $W_{6nm}$. The heating conductive layer has partially the same parameters that $L_H$=30.0 μm, $W_H$=30.9 μm and $D_H$=55.0 μm as the heating conductive layer B. The concave portion has parameters that $W_C$=100.0 μm, $L_C$=62.0 μm, $T_E$=10.0 μm and $D_C$=43.0 μm.

As shown in the figure, the $W_{6nm}$ in the present $T_S$ range becomes smaller than that of the conventional example B, and decreases as the $T_E$ increases.

Table 4 illustrates the observed $W_{6nm}$ values shown in FIG. 17.

TABLE 4

|  | $W_{6\,nm}$ (mW) | Ratio of $W_{6\,nm}$ to conventional example B |
|---|---|---|
| Conventional example B | 87 |  |
| $T_S$ = 0.3 μm | 58 | 67% (reduced by 33%) |
| $T_S$ = 1.0 μm | 55 | 63% (reduced by 37%) |
| $T_S$ = 5.0 μm | 51 | 59% (reduced by 41%) |
| $T_S$ = 10.0 μm | 46 | 53% (reduced by 47%) |

According to the table, the $W_{6nm}$ values in the cases that $T_S$=0.3 μm, 1.0 μm, 5.0 μm and 10.0 μm as the embodiments according to the present invention, are reduced by approximately 33%, 37%, 41% and 47% compared with the conventional example B respectively. Therefore, it is clarified that the $T_S$ ranging in the figure effects a significant reduction in the power consumption. It is also noticed that the larger the $T_S$ value is, the more significant the reduction is.

However, because the $T_S$ is equivalent to the thickness of the insulating layer 41, the larger the $T_S$ values is, the larger the whole volume of the insulating layer 41 becomes. The insulating layer 41 is also formed in the whole region directly below the magnetic head element. Therefore, much larger $T_S$ causes the TPTP phenomenon originating from the inductive write head element to increase due to the rather large expansion of the insulating layer 41. As described above, it is preferable that the TPTP phenomenon originating from the inductive write head element is limited. Therefore, the $T_S$ value is actually determined by compromise between the required amount of reduction in the power consumption and the acceptable amount of the TPTP phenomenon originating from the inductive write head element.

In the above-mentioned thin-film magnetic head according to the present invention, the heating conductive layer is positioned directly above the thermal expansion layer. Meanwhile, it is not impossible that the heating conductive layer may be provided on the bottom of the concave portion, and covered with the thermal expansion layer. However, in the formation process that the film for forming the heating conductive layer deposited on the bottom of the concave portion is patterned, the patterning accuracy essentially become rather low. As the result, the resistance of the heating conductive layer is varied due to the variety of the size of the heating portion, and therefore, it becomes difficult to set and control the amount of heating finely. On the contrary, the heating conductive layer according to the present invention is formed, only through the thin insulating layer, on the thermal expansion layer the upper surface of which is a planarized plane formed by CMP method and so on with the same height as the surrounding element-formed surface. Therefore, the resistance of the heating conductive layer can be easily designed with high patterning accuracy, and therefore, the amount of heating can be finely set and controlled.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising:
   a substrate having at least one concave portion in an element-formed-surface area of the substrate, and an air bearing surface;
   at least one magnetic head element formed above or on said element-formed surface;
   at least one thermal expansion layer having a larger coefficient of thermal expansion than said substrate and embedded in said at least one concave portion; and
   at least one heating means positioned directly above said at least one thermal expansion layer.

2. The thin-film magnetic head as claimed in claim 1, wherein said at least one heating means is provided in a position opposite to said air bearing surface in relation to said at least one magnetic head element.

3. The thin-film magnetic head as claimed in claim 1, wherein said at least one heating means is at least one heating conductive layer formed of a conductive material generating heat by current flow.

4. The thin-film magnetic head as claimed in claim 1, wherein a spacer layer formed of an insulating material is provided between said at least one heating means and said at least one thermal expansion layer.

5. The thin-film magnetic head as claimed in claim 1, wherein said at least one thermal expansion layer is formed of an insulating material.

6. The thin-film magnetic head as claimed in claim 1, wherein an upper surface of said at least one thermal expansion layer is a planarized plane with the same height as said surrounding element-formed surface.

7. The thin-film magnetic head as claimed in claim 1, wherein at least center portion of an upper surface of said at least one thermal expansion layer is positioned below said element-formed surface, and a lower surface of said at least one heating means is positioned below said element-formed surface.

8. The thin-film magnetic head as claimed in claim 1, wherein the amount of a depth of said at least one concave portion from said element-formed surface is 6 to 100 μm.

9. The thin-film magnetic head as claimed in claim 1, wherein the amount of a depth of said at least one concave portion from said element-formed surface is 40 to 100 μm.

10. The thin-film magnetic head as claimed in claim 1, wherein said at least one magnetic head element comprises at least one inductive write head element and/or at least one giant/tunnel magnetoresistive read head element.

11. The thin-film magnetic head as claimed in claim 1, wherein an overcoat layer is formed so as to cover over said at least one magnetic head element and said at least one heating means.

12. A head gimbal assembly comprising:
   a thin-film magnetic head comprising:
      a substrate having at least one concave portion in an element-formed-surface area of the substrate, and an air bearing surface;

at least one magnetic head element formed above or on said element-formed surface;

at least one thermal expansion layer having a larger coefficient of thermal expansion than said substrate and embedded in said at least one concave portion; and at least one heating means positioned directly above said at least one thermal expansion layer; and trace conductors for supplying currents to said at least one heating means.

13. The head gimbal assembly as claimed in claim 12, wherein said at least one heating means is provided in a position opposite to said air bearing surface in relation to said at least one magnetic head element.

14. The head gimbal assembly as claimed in claim 12, wherein said at least one heating means is at least one heating conductive layer formed of a conductive material generating heat by current flow.

15. The head gimbal assembly as claimed in claim 12, wherein a spacer layer formed of an insulating material is provided between said at least one heating means and said at least one thermal expansion layer.

16. The head gimbal assembly as claimed in claim 12, wherein said at least one thermal expansion layer is formed of an insulating material.

17. The head gimbal assembly as claimed in claim 12, wherein an upper surface of said at least one thermal expansion layer is a planarized plane with the same height as said surrounding element-formed surface.

18. The head gimbal assembly as claimed in claim 12, wherein at least center portion of an upper surface of said at least one thermal expansion layer is positioned below said element-formed surface, and a lower surface of said at least one heating means is positioned below said element-formed surface.

19. The head gimbal assembly as claimed in claim 12, wherein the amount of a depth of said at least one concave portion from said element-formed surface is 6 to 100 µm.

20. The head gimbal assembly as claimed in claim 12, wherein the amount of a depth of said at least one concave portion from said element-formed surface is 40 to 100 µm.

21. The head gimbal assembly as claimed in claim 12, wherein said at least one magnetic head element comprises at least one inductive write head element and/or at least one giant/tunnel magnetoresistive read head element.

22. The head gimbal assembly as claimed in claim 12, wherein an overcoat layer is formed so as to cover over said at least one magnetic head element and said at least one heating means.

23. A magnetic disk drive apparatus comprising:
at least one head gimbal assembly comprising:
a thin-film magnetic head comprising:
a substrate having at least one concave portion in an element-formed-surface area of the substrate, and an air bearing surface;
at least one magnetic head element formed above or on said element-formed surface;
at least one thermal expansion layer having a larger coefficient of thermal expansion than said substrate and embedded in said at least one concave portion; and
at least one heating means positioned directly above said at least one thermal expansion layer; and
trace conductors for supplying currents to said at least one heating means; and
a heating control means for controlling currents supplied to said at least one heating means.

24. The magnetic disk drive apparatus as claimed in claim 23, wherein said at least one heating means is provided in a position opposite to said air bearing surface in relation to said at least one magnetic head element.

25. The magnetic disk drive apparatus as claimed in claim 23, wherein said at least one heating means is at least one heating conductive layer formed of a conductive material generating heat by current flow.

26. The magnetic disk drive apparatus as claimed in claim 23, wherein a spacer layer formed of an insulating material is provided between said at least one heating means and said at least one thermal expansion layer.

27. The magnetic disk drive apparatus as claimed in claim 23, wherein said at least one thermal expansion layer is formed of an insulating material.

28. The magnetic disk drive apparatus as claimed in claim 23, wherein an upper surface of said at least one thermal expansion layer is a planarized plane with the same height as said surrounding element-formed surface.

29. The magnetic disk drive apparatus as claimed in claim 23, wherein at least center portion of an upper surface of said at least one thermal expansion layer is positioned below said element-formed surface, and a lower surface of said at least one heating means is positioned below said element-formed surface.

30. The magnetic disk drive apparatus as claimed in claim 23, wherein the amount of a depth of said at least one concave portion from said element-formed surface is 6 to 100 µm.

31. The magnetic disk drive apparatus as claimed in claim 23, wherein the amount of a depth of said at least one concave portion from said element-formed surface is 40 to 100 µm.

32. The magnetic disk drive apparatus as claimed in claim 23, wherein said at least one magnetic head element comprises at least one inductive write head element and/or at least one giant/tunnel magnetoresistive read head element.

33. The magnetic disk drive apparatus as claimed in claim 23, wherein an overcoat layer is formed so as to cover over said at least one magnetic head element and said at least one heating means.

34. The magnetic disk drive apparatus as claimed in claim 23, wherein said heating control means is a control means for supplying currents to said at least one heating means at least during operation of said at least one magnetic head element.

35. The magnetic disk drive apparatus as claimed in claim 23, wherein said heating control means comprises a signal system for controlling said at least one heating means, and said signal system controls currents supplied to said at least one heating means independently from operations of a signal system for controlling operations of said at least one magnetic head element.

36. The magnetic disk drive apparatus as claimed in claim 23, wherein said heating control means comprises a detecting means for detecting an acoustic emission component included in a reproduced data signal from said at least one magnetic head element and controls currents supplied to said at least one heating means according to the amount of said acoustic emission component detected by said detecting means.

37. The magnetic disk drive apparatus as claimed in claim 23, wherein said heating control means comprises a temperature detecting means for detecting a temperature inside said magnetic disk drive apparatus and controls currents supplied to said at least one heating means according to a degree of said temperature detected by said temperature detecting means.

* * * * *